United States Patent
Watanabe et al.

(10) Patent No.: US 7,720,295 B2
(45) Date of Patent: May 18, 2010

(54) METHOD AND APPARATUS FOR CODING IMAGES WITH DIFFERENT IMAGE QUALITIES FOR EACH REGION THEREOF, AND METHOD AND APPARATUS CAPABLE OF DECODING THE IMAGES BY ADJUSTING THE IMAGE QUALITY

(75) Inventors: Tsuyoshi Watanabe, Gifu (JP); Shigeyuki Okada, Ogaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 1051 days.

(21) Appl. No.: 11/168,671

(22) Filed: Jun. 29, 2005

(65) Prior Publication Data
US 2005/0286741 A1  Dec. 29, 2005

(30) Foreign Application Priority Data
Jun. 29, 2004 (JP) ............................. 2004-190802
Aug. 31, 2004 (JP) ............................. 2004-251939

(51) Int. Cl.
G06K 9/36 (2006.01)
G06K 9/46 (2006.01)
(52) U.S. Cl. ...................... 382/233; 382/243
(58) Field of Classification Search ................ 382/233, 382/240, 243, 103
See application file for complete search history.

(56) References Cited

U.S. PATENT DOCUMENTS 5,799,109 A     8/1998   Chung et al.
6,584,230 B2 *  6/2003   Yamaguchi et al. .......... 382/243
6,804,405 B2    10/2004  Christopoulos et al.

(Continued)

FOREIGN PATENT DOCUMENTS

CN    1305684 A    7/2001

(Continued)

OTHER PUBLICATIONS

Japanese Office Action for related JP Application No. 2004-316735, Dec. 9, 2008, 4P, Japan.

(Continued)

*Primary Examiner*—Phuoc Tran
(74) *Attorney, Agent, or Firm*—Ditthavong, Mori & Steiner, P.C.

(57) ABSTRACT

A region of interest is set within an image, the region of interest is tracked along motion of an object marked out within the image, and coding is performed in a manner that image quality differs between the region of interest and a region other than the region of interest. A wavelet transform unit applies a low-pass filter and a high-pass filter in the respective x and y directions of an original image, and divides the image into four frequency sub-bands so as to carry out a wavelet transform. A quantization unit quantizes, with a predetermined quantizing width, the wavelet transform coefficients outputted from the wavelet transform unit. A motion detector detects the motion of an object. A ROI setting unit moves a ROI region according to this motion of an object. In the case of moving images where a viewpoint changes, the background may be separated from the object and then the ROI region may be moved according to the motion of the object and the motion of the background.

7 Claims, 23 Drawing Sheets

U.S. PATENT DOCUMENTS

| | | | |
|---|---|---|---|
| 2001/0024525 | A1 | 9/2001 | Hata et al. |
| 2001/0048770 | A1 | 12/2001 | Maeda |
| 2002/0126906 | A1 | 9/2002 | Christopoulos et al. |
| 2002/0154823 | A1 | 10/2002 | Okada |
| 2004/0013310 | A1* | 1/2004 | Suino et al. ............... 382/240 |
| 2004/0095477 | A1 | 5/2004 | Maki et al. |
| 2005/0025371 | A1 | 2/2005 | Atsumi et al. |

FOREIGN PATENT DOCUMENTS

| | | |
|---|---|---|
| CN | 1320337 A | 10/2001 |
| CN | 1320337 A | 10/2001 |
| CN | 1420633 A | 5/2003 |
| CN | 1496110 A | 5/2004 |
| JP | 04-022280 A | 1/1992 |
| JP | 05-300516 A | 11/1993 |
| JP | 7-203434 | 8/1995 |
| JP | 07-288806 A | 10/1995 |
| JP | 8-280030 | 10/1996 |
| JP | 9-46710 A | 2/1997 |
| JP | 10-98732 | 4/1998 |
| JP | 10-271510 | 10/1998 |
| JP | 10-304353 A | 11/1998 |
| JP | 10-304353 A | 11/1998 |
| JP | 11-75178 A | 3/1999 |
| JP | 2001-45484 | 2/2001 |
| JP | 2001-045484 A | 2/2001 |
| JP | 2001-119625 | 4/2001 |
| JP | 2001-128126 A | 5/2001 |
| JP | 2001-160062 A | 6/2001 |
| JP | 2001-160062 A | 6/2001 |
| JP | 2001-313944 A | 11/2001 |
| JP | 2002-04455 | 2/2002 |
| JP | 2002-94991 | 3/2002 |
| JP | 2002-508606 A | 3/2002 |
| JP | 2002-135593 | 5/2002 |
| JP | 2002-325257 | 11/2002 |
| JP | 2002-330951 | 11/2002 |
| JP | 2003-204436 | 7/2003 |
| JP | 2003-299033 A | 10/2003 |
| JP | 2004-040429 A | 2/2004 |
| JP | 2004-072655 | 3/2004 |
| JP | 2004-228680 A | 8/2004 |
| JP | 2004-228680 A | 8/2004 |
| JP | 2004-240844 A | 8/2004 |
| JP | 2004-316735 | 6/2008 |
| JP | 2004-094449 | 7/2008 |
| JP | 2004-190802 | 7/2008 |
| JP | 2004-032383 | 8/2008 |
| WO | WO 99/49412 | 9/1999 |
| WO | WO 99/49413 | 9/1999 |
| WO | WO 00/01153 | 1/2000 |
| WO | WO 00/22832 | 4/2000 |
| WO | WO 03/034740 A1 | 4/2003 |

OTHER PUBLICATIONS

Chinese Office Action issued in Chinese Patent Application No. CN 200510081494.1, dated Feb. 15, 2008.
U.S. Appl. No. 11/052,094, filed Feb. 8, 2005, Taketa et al.
U.S. Appl. No. 11/718,211, filed Apr. 27, 2007, Taketa et al.
U.S. Appl. No. 11/718,291, filed Apr. 30, 2007, Okada et al.
U.S. Appl. No. 11/762,456, filed Jun. 13, 2007, Okada et al.
International Search Report issued in International Patent Application No. PCT/JP2005/019582, dated Jan. 17, 2006.
International Preliminary Report on Patentability issued in International Patent Application No. PCT/JP2005/019582, dated May 1, 2007.
International Search Report issued in International Patent Application No. PCT/JP2005/019583, dated Dec. 27, 2005.
International Preliminary Report on Patentability issued in International Patent Application No. PCT/JP2005/019583, dated May 1, 2007.
Chinese Office Action Issued in Chinese Application No. 2005100079334, dated Nov. 3, 2006 (issued in corresponding CN application to related U.S. Appl. No. 11/052,094).
"Information technology—JPEG 2000 image coding system—Part 1: Core coding system," ISO/IEC 15444-1, Dec. 15, 2000, Annex H "Coding of Images with regions of interest".
Chinese Office Action issued in Chinese Patent Application No. CN 200510007933.4, dated Nov. 16, 2007.
Chinese Office Action with English translation Issued in Chinese Patent Application No. CN 2005-80036816.9 dated on Apr. 4, 2008.
Chinese Office Action (with English Translation) issued in Chinese Patent Application No. CN 200510081494.1, dated Aug. 3, 2007.
Official Action Dated Oct. 14, 2008 From the JP Patent Office Re.: Application No. 2004-190802 (with English translation).
Official Action Dated Sep. 9, 2008 From the JP Patent Office Re.: Application No. 2004-316735 (with English translation).
Taiwanese Office Action for related TW Application No. 94137601, Feb. 25, 2009, Taiwan.
Japanese Office Action for corresponding JP Application No. 2007-157542, Jun. 9, 2009, Japan.
Japanese Office Action for corresponding JP Application No. 2007-157544, Jun. 9, 2009, Japan.
Japanese Office Action for corresponding JP Application No. 2004-251939, Jun. 30, 2009, Japan.
Chinese Office Action for corresponding Patent Application No. CN200510007933.4, dated Jul. 17, 2009, China.
Japanese Office Action for corresponding JP Application No. 2007-157542, Sep. 1, 2009, Japan.
Japanese Office Action for corresponding JP Application No. 2007-157544, Sep. 1, 2009, Japan.
Korean Office Action for corresponding KR Application No. 10-2007-7012013, Aug. 31, 2009, Korea.
Korean Office Action for corresponding KR Application No. 10-2008-7008106, Aug. 31, 2009, Korea.
Korean Office Action for corresponding KR Application No. 10-2008-7008107, Aug. 31, 2009, Korea.
Chinese Office Action for corresponding CN Application No. 200710197162.9, Oct. 30, 2009, China.
Chinese Office Action for corresponding CN Application No. 200510007933.4, dated Jan. 22, 2010, pp. 1-15, China.
Japanese Office Action for corresponding JP Application No. 2004-032394, dated Jan. 19, 2010, pp. 1-5, Japan.
Japanese Office Action for corresponding JP Application No. 2004-316734, dated Dec. 8, 2009, pp. 1-4, Japan.
Japanese Office Action for corresponding JP Application No. 2004-316735, dated Feb. 9, 2010, pp. 1-15, Japan.

* cited by examiner

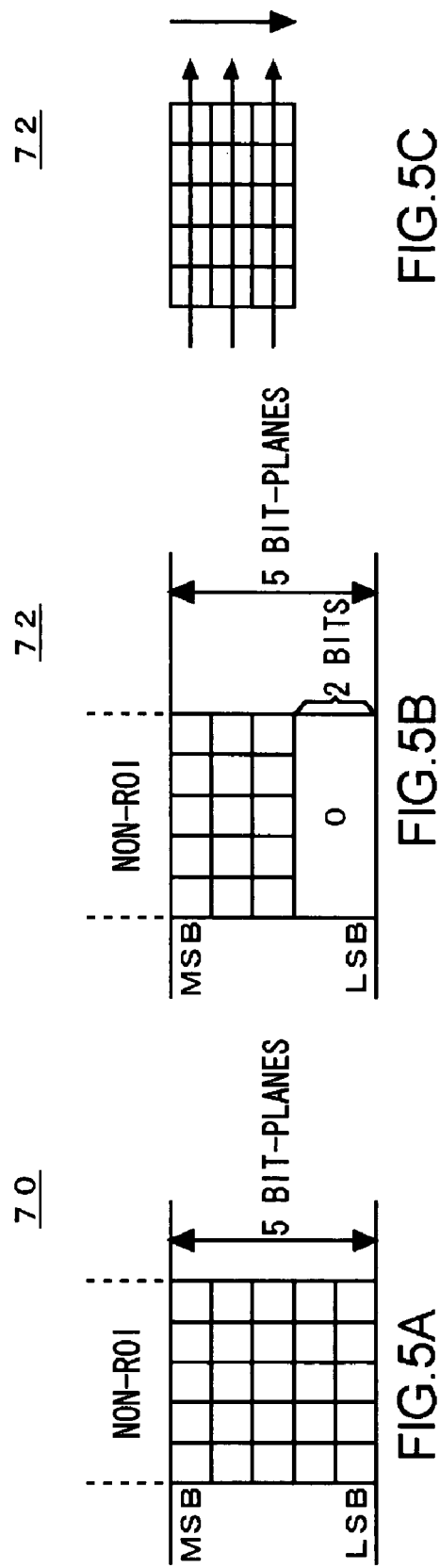

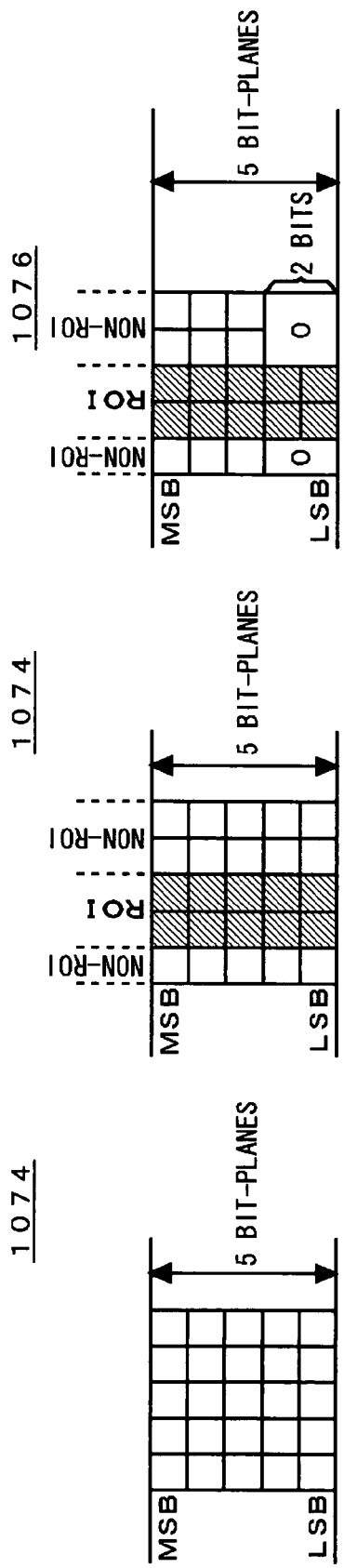

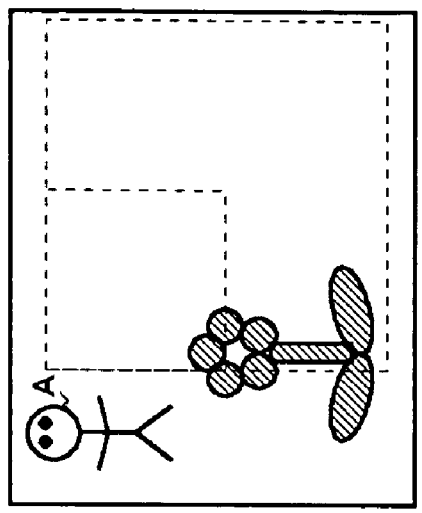
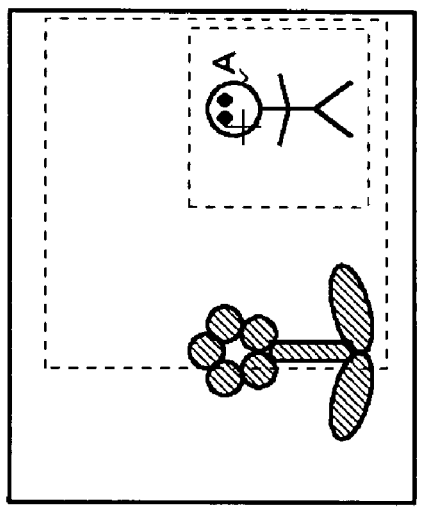
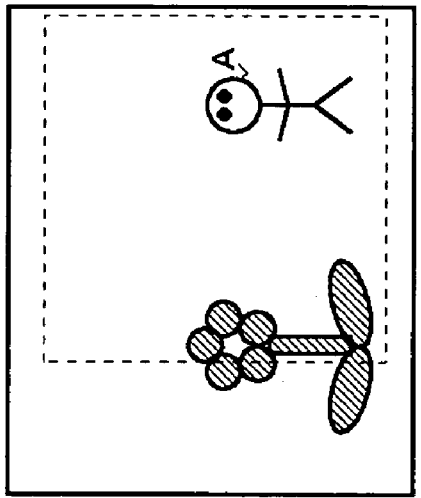
FIG.23A
FIG.23B
FIG.23C

METHOD AND APPARATUS FOR CODING IMAGES WITH DIFFERENT IMAGE QUALITIES FOR EACH REGION THEREOF, AND METHOD AND APPARATUS CAPABLE OF DECODING THE IMAGES BY ADJUSTING THE IMAGE QUALITY

BACKGROUND OF THE INVENTION

1. Field of the Invention

The present invention relates to an image coding method, an image coding apparatus and an image pickup apparatus and it particularly relates to method and apparatus capable of coding images with different image qualities for each region as well as an image acquiring apparatus therefor.

2. Description of the Related Art

At ISO/ITU-T, JPEG2000 using a discrete wavelet transform (DWT) is being standardized as a successor to JPEG (Joint Photographic Expert Group), which is a standard technology for compression and coding of still images. In JPEG2000, a wide range of image quality, from low bit-rate coding to lossless compression, can be coded highly efficiently, and a scalability function, in which the image quality is gradually raised, can be realized easily. Furthermore, JPEG2000 comes with a variety of functions which the conventional JPEG standard did not have.

As one of the functions of JPEG2000, the ROI (Region-Of-Interest) coding is standardized, in which a region of interest of an image is coded and transferred in preference to other regions. Because of this ROI coding, when the coding rate has an upper limit, the reproduced image quality of a region of interest can be raised preferentially, and also when a codestream is decoded in sequence, a region of interest can be reproduced earlier with high quality.

Reference (1) listed in the following Related Art List discloses a technology in which a plurality of ROI regions within image data are automatically recognized.

Related Art List
(1) Japanese Patent Application Laid-Open No. 2004-72655.

As described in the paragraph [0079] of the above Reference (1), when an image pickup apparatus is in the video shooting mode, the ROI is automatically set for the image of each frame shot. In the above Reference (1), however, there is a possibility that an undesired moving body, which is not intended by a photographer (user), might be set in the ROI region when a plurality of moving bodies are recognized in the image. Though it is described therein that user's favorite ROI regions can be selected from the plurality of ROI regions, it is troublesome to select such a ROI region per frame from the moving images and it is impossible to select the ROI regions during the shooting of moving pictures. Performing the recognition processing of ROI regions per frame results in a large amount of computation, thus increasing the signal processing load.

SUMMARY OF THE INVENTION

The present invention has been made in view of the foregoing circumstances and problems, and an object thereof is to provide an image coding method, an image coding apparatus and an image pickup apparatus capable of reducing the code amount of moving images while maintaining a user-intended level of image quality of an object marked out by a user. The objects are achieved by combinations described in the independent claims. The dependent claims define further advantageous and exemplary combinations of the present invention.

In order to solve the above problems, a method according to a preferred mode of carrying out the present invention is an image coding method characterized in that a region of interest is set within an image, the region of interest is tracked along motion of an object marked out within the image, and coding is performed in a manner that image quality differs between the region of interest and a region other than the region of interest. A region of interest may be initially set by a user operation.

According to this mode of carrying out the present invention, the image quality of a non-region-of-interest can be lowered while the image quality of a region of interest is kept at the user-intended level, so that the code amount can be reduced. The image quality of a region of interest can also be lowered on purpose.

Another preferred mode of carrying out the present invention relates to an image coding apparatus. This apparatus includes: a region-of-interest setting unit which sets a region of interest within an image; a motion detector which detects motion of an object marked out within the image; and a coding unit which codes images with image quality that differs between the region of interest and a region other than the region of interest, wherein the region-of-interest setting unit has the region of interest follow the motion of an object. Motion vectors may be used to detect the "motion of an object".

According to this mode of carrying out the present invention, the image quality of a non-region-of-interest can be lowered while the image quality of a region of interest is kept at the user-intended level, so that the code amount can be reduced. The image quality of a region of interest can also be lowered on purpose. The object can be automatically tracked even without the recognition of a region of interest per frame and any setting by a user operation.

The apparatus may further include an image quality setting unit which sets an image quality for the region other than the region of interest, based on an allotted code amount. The "allotted code amount" may be a code amount assigned for each frame or that allotted to the entire moving image. The "image quality setting unit" may dynamically adjust the image quality during a coding processing. Even under the condition of which the code amount has already been allotted, the image quality for a region of interest can be kept at the user-intended level by adjusting the code amount of a non-region-of-interest.

The apparatus may further include an object extracting unit which separates background in moving images where a viewpoint changes, wherein the region-of-interest setting unit may have the region of interest follow the motion of an object, in accordance with motion of the background. With this structure, the same level of accuracy as in the case where the viewpoint is fixed can be obtained by offsetting the motion of background.

Still another preferred mode of carrying out the present invention relates to an image pickup apparatus. This apparatus has an image pickup unit which acquires an image, wherein a region of interest is set within the image, the region of interest is tracked along motion of an object marked out within the image, and coding is performed in a manner that image quality differs between the region of interest and a region other than the region of interest.

According to this mode of carrying out the present invention, the image quality of a non-region-of-interest can be lowered while the image quality of a region of interest is kept at the user-intended level, so that the code amount can be reduced. The image quality of a region of interest can also be purposely lowered.

Still another preferred mode of carrying out the present invention relates also to an image pickup apparatus. This apparatus includes: an image pickup unit which acquires an image; a region-of-interest setting unit which sets a region of interest within an image; a motion detector which detects motion of an object marked out within the image; and a coding unit which codes images with image quality that differs between the region of interest and a region other than the region of interest, wherein the region-of-interest setting unit has the region of interest follow the motion of an object. A region of interest may be initially set by a user operation.

According to this mode of carrying out the present invention, the image quality of a non-region-of-interest can be lowered while the image quality of a region of interest is kept at the user-intended level, so that the code amount can be reduced. The image quality of a region of interest can also be lowered on purpose. There can be provided an image pickup apparatus such that the object can be automatically tracked even without the recognition of a region of interest per frame and any setting by a user operation.

The image pickup apparatus may further include an image quality setting unit which sets an image quality for the region other than the region of interest, based on an allotted code amount. The "allotted code amount" may be a code amount assigned for each frame or that allotted to the moving entire image. The "image quality setting unit" may dynamically adjust the image quality during a coding processing. Even under the condition of which the code amount has already been allotted, the image quality for a region of interest can be kept at the user-intended level by adjusting the code amount of a non-region-of-interest.

The image pickup apparatus may further include an object extracting unit which separates background in moving images where a viewpoint fluctuates, wherein the region-of-interest setting unit may have the region of interest follow the motion of an object, in accordance with motion of the background. By implementing this structure, the same level of accuracy as in the case where the viewpoint is fixed can be obtained by offsetting the motion of background.

It is to be noted that any arbitrary combination of the above-described structural components and expressions changed among a method, an apparatus, a system, a computer program, a recording medium and so forth are all effective as and encompassed by the present embodiments.

Moreover, this summary of the invention does not necessarily describe all necessary features so that the invention may also be sub-combination of these described features.

BRIEF DESCRIPTION OF THE DRAWINGS

FIG. 5A shows 5 bit-plane wavelet transform coefficients composed of non-ROI transform coefficients alone; FIG. 5B shows wavelet transform coefficients in which the lower 2 bit-planes from the LSB side are substituted with zeros; and FIG. 5C shows how the higher 3 bit-planes of the wavelet transform coefficients after a zero-substitution is entropy-coded in order from top.

FIG. 15A shows wavelet transform coefficients of a decoded image; FIG. 15B shows ROI transform coefficients and non-ROI transform coefficients; and FIG. 15C shows how two lower bits of non-ROI transform coefficients are zero-substituted.

FIG. 23A shows how a range in which a ROI region is tracked is set; FIG. 23B shows how a ROI region is set; and FIG. 23C shows how an object moves and then moves out of the large frame.

DETAILED DESCRIPTION OF THE INVENTION

The invention will now be described based on the preferred embodiments, which do not intend to limit the scope of the present invention, but exemplify the invention. All of the features and the combinations thereof described in the embodiments are not necessarily essential to the invention. The first embodiment will be first described.

First Embodiment

Embodiment 1

Figure 1:
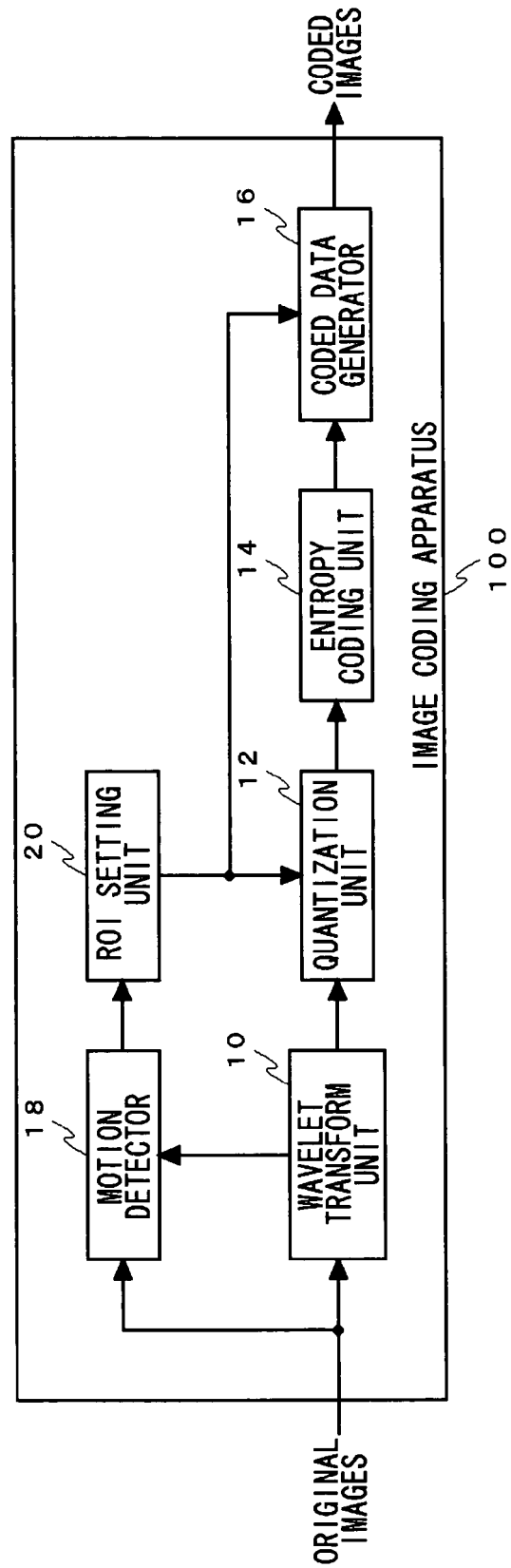
FIG. 1 illustrates a structure of an image coding apparatus according to Embodiment 1 of a first embodiment of the present invention.

FIG. 1 illustrates a structure of an image coding apparatus 100 according to Embodiment 1 of a first embodiment. In terms of hardware, this structure of image coding apparatus 100 can be realized by a CPU, a memory and other LSIs of an arbitrary computer. In terms of software, it can be realized by memory-loaded programs which have coding functions or the like, but drawn and described herein are function blocks that are realized in cooperation with those. Thus, it is understood by those skilled in the art that these function blocks can be realized in a variety of forms such as by hardware only, software only or the combination thereof.

The image coding apparatus 100 performs compression and coding of inputted original images by, for example, JPEG2000 scheme. Original images inputted to the image coding apparatus 100 are frames of moving images. The image coding apparatus 100 encodes sequentially each frame of the moving images by the JPEG200 scheme so as to generate codestreams of the moving images.

A wavelet transform unit 10 in the image coding apparatus 100 divides the inputted original image into sub-bands, computes wavelet transform coefficients of each of the sub-bands and then generates hierarchized wavelet coefficients. More specifically, the wavelet transform unit 10 applies a low-pass filter and a high-pass filter in the respective x and y directions of an original image, and divides the image into four frequency sub-bands so as to carry out a wavelet transform. These sub-bands are an LL sub-band which has low-frequency components in both x and y directions, an HL sub-band and an LH sub-band which have a low-frequency component in one of the x and y directions and a high-frequency component in the other, and an HH sub-band which has high-frequency components in both x and y directions. The number of pixels in the vertical and horizontal directions of each sub-band is ½ of that of the image before the processing, and one time of filtering produces sub-band images whose resolution, or image size, is ¼ of the image.

The wavelet transform unit 10 performs another filtering processing on the image of the LL sub-band among the thus obtained sub-bands and divides it into another four sub-bands LL, HL, LH and HH so as to perform the wavelet transform thereon. The wavelet transform unit 10 performs this filtering a predetermined number of times, hierarchizes the original image into sub-band images and then outputs wavelet transform coefficients for each of the sub-bands. A quantization unit 12 quantizes, with a predetermined quantizing width, the wavelet transform coefficients outputted from the wavelet transform unit 10.

A motion detector 18 detects the position of a specified object, and then outputs the detected position thereof to a region-of-interest (ROI) setting unit 20. The object may be specified by a user or it may be automatically recognized by the motion detector 18 from within a user-specified ROI. Also, it may be automatically recognized from the entire image. A plurality of objects may be specified. It is to be noted here that the "region of interest" will be also referred to as ROI or ROI region.

In the case of motion images, the position of an object can be expressed by motion vectors. Hereinbelow, a specific detection method by motion vectors will be described using examples. Firstly, the motion detector 18 is provided with memories such as SRAM and SDRAM, and it stores in said memory as a reference image the image of an object specified in the frame at the time when the object was specified. It is preferable that the reference image having a block, of a predetermined size, containing the specified position be stored. The motion detector 18 detects a motion vector by comparing the reference image with the image of a current frame. The motion vector can be calculated by using high-frequency components of wavelet transform coefficients and estimating contour components of the object. Alternatively, the MSB (Most Significant Bit) bit-plane or a plurality of MSB-side bit-planes of the wavelet transform coefficients after quantization may be used.

Secondly, the motion detector 18 compares the current frame with a previous frame, for example, the frame immediately before the current frame, so as to detect the motion vectors of an object. Thirdly, the motion detector 18 compares wavelet transform coefficients after wavelet transform, instead of the frame images, and thereby detects the motion vectors. The wavelet coefficient may be one associated with any of LL sub-band, HL sub-band, LH sub-band and HH sub-band. An object which is to be compared with the current frame may be a reference image registered at the time of specification or a reference image registered from a previous frame, for example, the frame immediately before it.

Fourthly, the motion detector 18 detects the motion vectors of an object using a plurality of wavelet transform coefficients. For instance, the motion vector can be detected for each of HL sub-band, LH sub-band and HH sub-band, and then the average of these three detected motion vectors can be calculated, or one which is closest to the motion vector of a previous frame is selected from among these three motion vectors. As a result, the accuracy in detecting the motion vectors of an object can be raised.

A user may specify beforehand in the motion detector 18 a range within which these motion vectors are to be detected in an image. For instance, when the image coding apparatus according to the present embodiment is applied to a surveillance camera for shops such as a convenience store, a processing can be performed in a manner that an object, such as a person, who has entered within a certain range from a cash register is marked out whereas the motion of an object who has gone out of the range is not marked.

A ROI setting unit 20 acquires, from the motion detector 18, positional information such as the motion vectors of objects, and moves a ROI region in accordance with the thus acquired positional information. Depending on a detection method implemented by the motion detector 18, a shift amount from the initially set ROI region or a travel distance from the immediately previous frame is calculated so as to determine the position of the ROI of the current frame.

The user sets the position, size, image quality or the like of a ROI region to the ROI setting unit 20 as initial values. When the user specifies an object or when the motion detector 18 performs automatic recognition, a predetermined range within which the object lies may be automatically set as the ROI region by the ROI setting unit 20.

The form of a ROI region may be a rectangular, circular or other complex shape. Though the form of a ROI region itself is a fixed shape in principle, the form may vary in the central part and the periphery of an image or the form may be dynamically varied by a user operation. Also, a plurality of ROI regions may be set.

The ROI setting unit 20 outputs ROI setting information to a quantization unit 12 and a coded data generator 16 so as to perform ROI coding on the information. As a ROI coding scheme, there is available the MAXSHIFT method in which the bit-planes of wavelet transform coefficients associated with a region of interest in an image (hereinafter referred to as "ROI transform coefficients") is scaled up by a maximum number of bits of the bit-plane of wavelet transform coefficients associated with non-ROI regions (hereinafter referred to as "non-ROI transform coefficients"). According to this technique, all the bit-planes of ROI transform coefficients are coded earlier than any of the bit-planes of non-ROI transform coefficients.

Figure 2A:
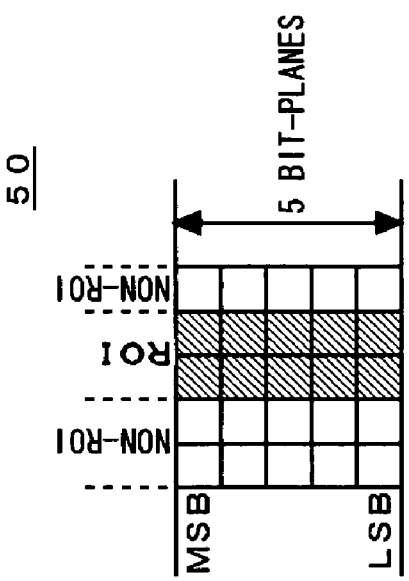
FIG. 2A shows wavelet transform coefficients.

An example where the ROI coding is carried out by the MAXSHIFT method is first explained. FIG. 2A shows wavelet transform coefficients 50 after a quantization, which include bit-planes each having five bits from MSB (Most Significant Bit) to LSB (Least Significant Bit).

The ROI setting unit 20 sets a region of interest (ROI) in an original image based on the positional information of the ROI region, and generates ROI masks that are used to specify the ROI transform coefficients, which are the wavelet transform coefficients associated with the thus set region of interest. The ROI transform coefficients are represented by the shaded portions in the wavelet transform coefficients 50 of FIG. 2A.

Figure 2B:
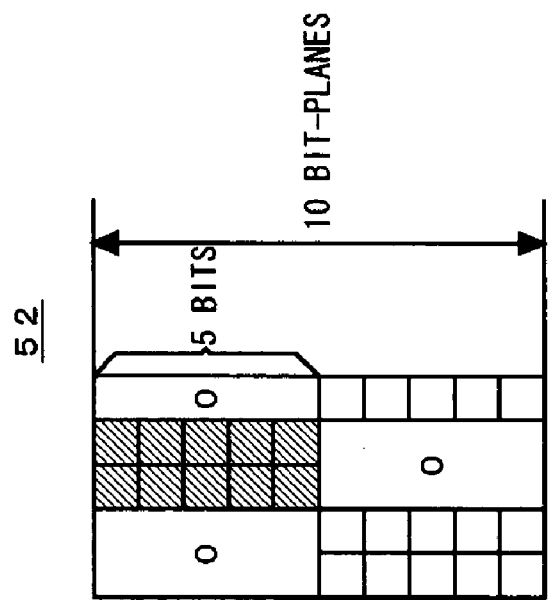
FIG. 2B shows wavelet transform coefficients with ROI transform coefficients scaled up by 5 bits.

A quantization unit 12 scales up the quantized ROI transform coefficients by S bits, using the ROI mask. That is, the values of the ROI transform coefficients are shifted to the left by as much as S bits. Here, the amount S of the scale-up is a natural number larger than the number of bits of the maximum value of the quantized values of non-ROI transform coefficients, which are the wavelet transform coefficients associated with the regions outside the region of interest. FIG. 2B shows wavelet transform coefficients 52 with the ROI transform coefficients scaled up by 5 bits. After the upscaling, zeros are assigned to the digits that are newly created as a result of the upscaling in the wavelet transform coefficients 52.

Figure 2C:
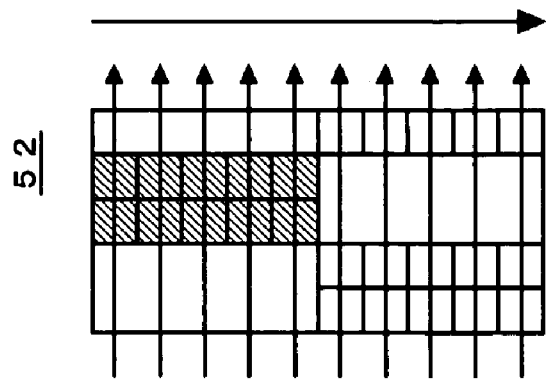
FIG. 2C shows how quantized values of wavelet transform coefficients resulting from a scale-up are scanned in order from high-order bit-planes.

An entropy coding unit 14 entropy-codes the quantized values of the wavelet transform coefficients 52 resulting from a scale-up, by scanning them in order from high-order bit-planes as indicated by the arrows in FIG. 2C.

A coded data generator 16 acquires the ROI setting information, such as the position and scale-up amount, from the ROI setting unit 20 and also acquires information necessary for generating headers, such as quantizing width, from the entropy coding unit 14 so as to generate the headers. The entropy-coded data are turned into a stream, which is then outputted, as coded images, to a recording medium or network. Here, an SDRAM, flash hard disk drive or the like may be used as the recording medium.

As described above, when the ROI coding is performed using the MAXSHIFT method, the bit-planes of a ROI region are preferentially coded even though the coding is terminated halfway to reduce the amount of codes. As a result, the image quality for the ROI region can be made higher than the image quality for the non-ROI region.

Next, an example in which the ROI coding is performed by reducing the bit-planes will be explained. The ROI setting unit 20 sets a region of interest in an original image and generates a ROI mask for specifying the wavelet transform coefficients corresponding to said region of interest, namely, the ROI transform coefficients, based on the information on the position of ROI region. If the region of interest selected is a rectangle, the ROI position information will be given as the coordinate values of pixels in the upper left corner of the rectangular region and the number of pixels of the rectangular region in the vertical and horizontal directions.

Figure 3C:
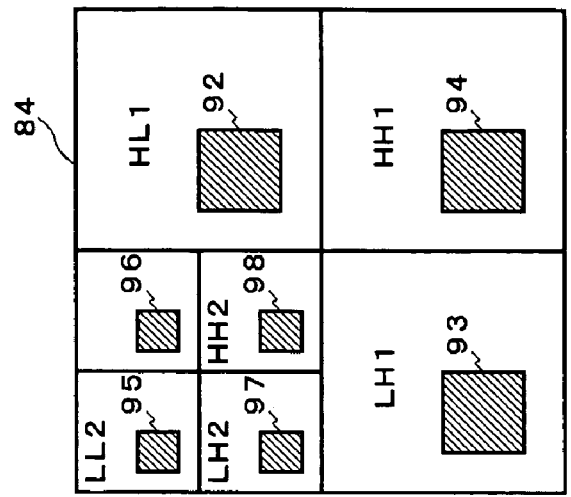
FIG. 3C shows a second-hierarchy transform image obtained by performing another wavelet transform on a sub-band LL1 of a transform image shown in FIG. 3B.
Figure 3B:
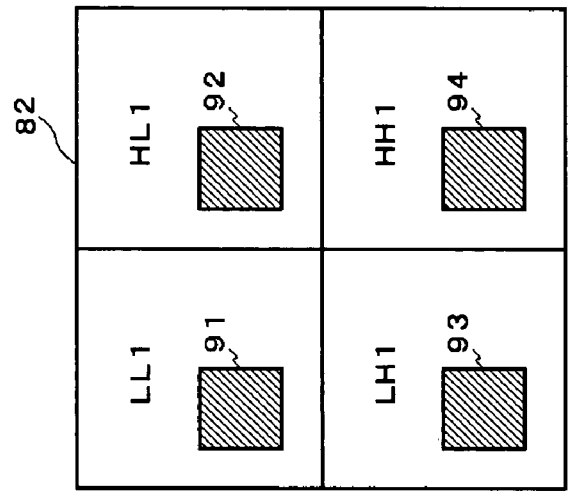
FIG. 3B shows a first-hierarchy transform image obtained by performing one-time wavelet transform on the original image.
Figure 3A:
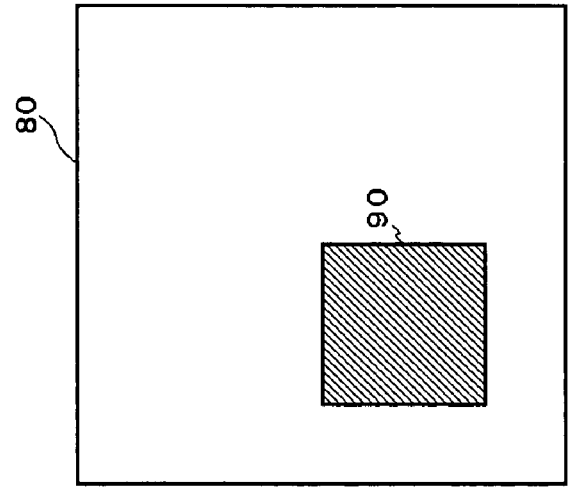
FIG. 3A illustrates a state in which a region of interest is selected in an original image.

FIGS. 3A to 3C illustrate ROI masks generated by the ROI setting unit 20. As shown in FIG. 3A, suppose that a region of interest 90 is selected in an original image 80 by the ROI setting unit 20. Then, the ROI setting unit 20 specifies, in each sub-band, wavelet transform coefficients necessary for restoring the selected region of interest 90 in the original image 80.

FIG. 3B shows a first-hierarchy transform image 82 obtained by performing one-time wavelet transform on the original image 80. The transform image 82 in the first hierarchy is composed of four first-level sub-bands which are represented here by LL1, HL1, LH1 and HH1. In each of the first-level sub-bands of LL1, HL1, LH1 and HH1, the ROI setting unit 20 specifies wavelet transform coefficients on the first-hierarchy transform image 82, namely, ROI transform coefficients 91 to 94 necessary for restoring the region of interest 90 in the original image 80.

FIG. 3C shows a second-hierarchy transform image 84 obtained by performing another wavelet transform on the sub-band LL1 which is the lowest-frequency component of the transform image 82 shown in FIG. 3B. Referring to FIG. 3C, the second-hierarchy transform image 84 contains four second-level sub-bands which are composed of LL2, HL2, LH2 and HH2, in addition to three first-level sub-bands HL1, LH1 and HH1. In each of the second-level sub-bands of LL2, HL2, LH2 and HH2, the ROI setting unit 20 specifies wavelet transform coefficients on the second-hierarchy transform image 84, namely, ROI transform coefficients 95 to 98 necessary for restoring the ROI transform coefficient 91 in the sub-band LL1 of the first-hierarchy transform image 82.

In the similar manner, by specifying recursively the ROI transform coefficients that correspond to the region of interest 90 at each hierarchy for a certain number of times corresponding to the number of wavelet transforms done, all ROI transform coefficients necessary for restoring the region of interest 90 can be specified in the final-hierarchy transform image. The ROI setting unit 20 generates a ROI mask for specifying the position of this finally specified ROI transform coefficient in the final-hierarchy transform image. For example, when the wavelet transform is carried out two times only, generated are ROI masks which can specify the position of seven ROI transform coefficients 92 to 98 which are represented by areas shaded by oblique lines in FIG. 3C.

After a quantization, the quantization unit 12 adjusts the number of low-order bits to be substituted with zeros in a bit string of the wavelet transform coefficients corresponding to a non-region-of-interest, according to a degree of priority in setting the image quality. And by referring to the ROI mask generated by the ROI setting unit 20, S bits only counted from the lowest bit in the bit string of the non-ROI transform coefficients not masked by the ROI masks are substituted with zeros. The number of zero-substitution bits, or S, is an arbitrary natural number the upper limit of which is the maximum number of bits of quantization values in the non-ROI region. By varying this number of zero-substitution bits S, a degradation degree of reproduced image of non-region-of-interest relative to the region of interest can be adjusted in a continuous manner.

Figure 4C:
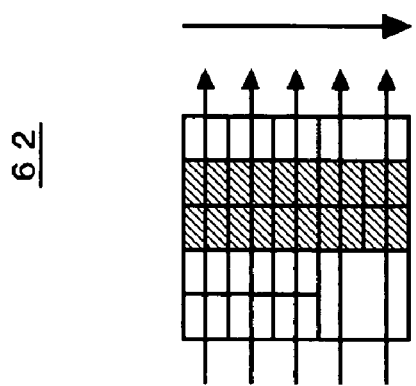
FIG. 4C shows how wavelet transform coefficients containing ROI transform coefficients and the zero-substituted non-ROI transform coefficients are scanned in order from high-order bit planes.
Figure 4B:
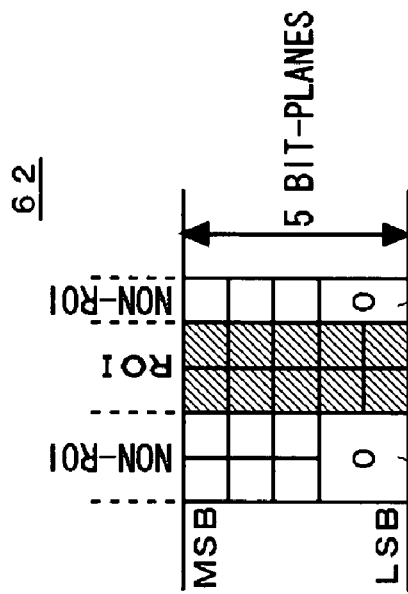
FIG. 4B shows how S bits in the LSB side of non-ROI transform coefficients are substituted with zeros.
Figure 4A:
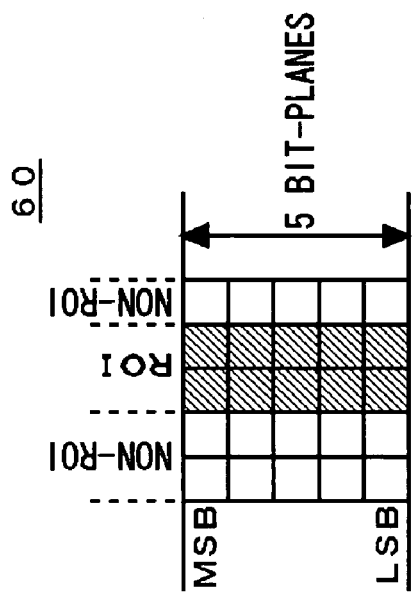
FIG. 4A shows wavelet transform coefficients.

FIGS. 4A to 4C illustrate how low-order bits of wavelet transform coefficients 60 of an original image are zero-substituted by the quantization unit 12. FIG. 4A shows the wavelet transform coefficients 60 obtained after a quantization, which include five bit-planes, and the ROI transform coefficients are represented by the area shaded by oblique lines.

Referring to FIG. 4B, the quantization unit 12 substitutes S bits in the LSB side of non-ROI transform coefficients which are not masked by the ROI masks, with zeros. S=2 in this example, and the wavelet transform coefficients 62 where 2 bits in the LSB side of non-ROI coefficients are substituted with zeros are obtained as shown by the reference numeral 64 of FIG. 4B.

The entropy coding unit 14 entropy-codes the wavelet transform coefficients 62 containing the ROI transform coefficients and the zero-substituted non-ROI transform coefficients by scanning the bit-planes in order from MSB as indicated by the arrows in FIG. 4C.

FIGS. 5A to 5C illustrate how low-order bits of wavelet transform coefficients are zero-substituted when there is no region of interest in an original image. FIG. 5A shows 5 bit-plane wavelet transform coefficients 70 composed of non-ROI transform coefficients alone since no region of interest is set in the original image. When the zero-substitution bit number S is 2, the quantization unit 12 generates wavelet transform coefficients 72 in which the lower 2 bit-planes from the LSB side among 5 bit-planes are substituted with zeros as shown in FIG. 5B.

The entropy coding unit 14 entropy-codes higher 3 bit-planes of the wavelet transform coefficients 72 after a zero-substitution, in order from top, as shown in FIG. 5C. In this case, the lower 2 bit-planes which have been zero-substituted are not coded. Instead of zero-substituting lower 2 bit-planes, the lower 2 bit-planes may simply be discarded.

The coded data generator 16 generates headers based on coding parameters such as quantizing width. The coded data generator 16 also processes entropy-coded data into a stream and outputs it to a recording medium or network as a coded image.

In a case where there is an upper limit set for the data size of a final coded image due to some limitations in storage capacity, transmission rate and so forth, the entropy coding unit 14 may, in order to operate within the upper limit of the data size, generally discontinue a coding process at a halfway bit-plane when the quantized wavelet coefficients are being coded in sequence from the higher bit-plane. Or, the coded data generator 16 may, in order to operate within the limit of transmission rate, discontinue the output of streams at a halfway bit-plane when stream-processed coded data are being outputted in order from the high-order bit-plane.

Accordingly, even when the data size of a coded image is subject to some limitation, the wavelet transform coefficients corresponding to non-region-of-interest are zero-substituted in low-order bit-planes and the wavelet transform coefficients corresponding to the region of interest only are subjected to coding as significant information. As a result, the compression efficiency for low-order bit-planes is high, and thus the data size will not increase much even when the coding covers down to and reaches the lowest bit-plane.

As described above, since the coding method by which to reduce bit planes doesn't go through the trouble of any scale-up processing of ROI transform coefficients, the coding computation can be carried out efficiently. Also, with no increase in the number of bit-planes to be coded, any extra storage area is not required, thus reducing hardware cost.

Also, since there is no need for scale-down processing to be performed at decoding, there is no need of adding the ROI position information and scale-up amount data to the header of the coded data. Furthermore, an image which has been ROI-coded by this method is no different in format from a normal coded image, so that it can be decoded by exactly the same decoding processing as for the normal coded image. This also ensures to retain compatibility among decoding processings.

Embodiment 2

Figure 6:
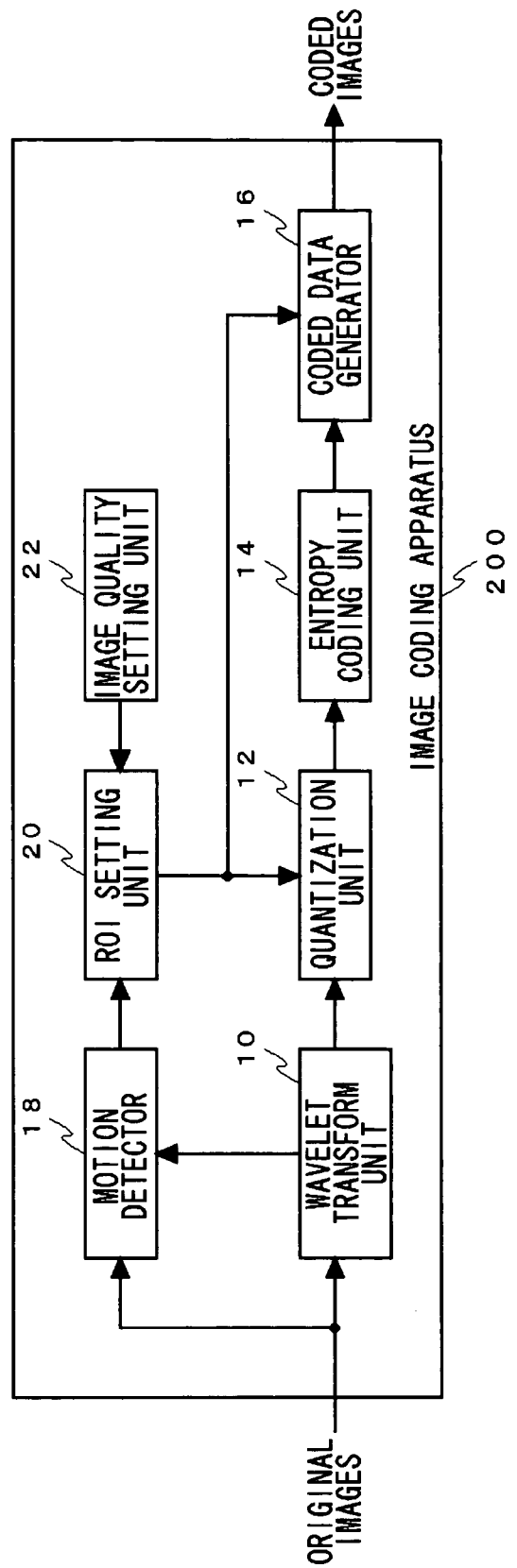
FIG. 6 illustrates a structure of an image coding apparatus according to Embodiment 2 of the first embodiment of the present invention.

FIG. 6 illustrates a structure of an image coding apparatus 200 according to Embodiment 2 of the first embodiment. The structure of this image coding apparatus 200 is such that an image quality setting unit 22 is newly added to the image coding apparatus 100 of Embodiment 1 of the first embodiment. Hereinbelow, the same reference numerals will be used for a structure identical to that of Embodiment 1 of the first embodiment, and the structure and operation different from those of Embodiment 1 of the first embodiment will be described.

The user can set the initial values of image quality for ROI region and non-ROI region to the ROI setting unit 20. Based on the code amount assigned for one frame, the image setting unit 22 may automatically determine the image quality of non-ROI region by computation and estimation. That is, the code amount of non-ROI region is reduced when the code amount of ROI region increases whereas the code amount of non-ROI region is increased when the code amount of ROI region drops. This will be reversed in such a case when the image quality of ROI region is intended to be lower than non-ROI region as when the ROI region is to be obscured and covered by a mosaic. In this case, the above scheme can be similarly realized if the above description of the ROI coding is read in such a manner that the ROI region is replaced by the non-ROI region.

The image setting unit 22 may adaptively adjust the code amount of non-ROI region in a manner that the code amount thereof is calculated and estimated from the code amount of images thus far captured during the shooting of moving images or from the remaining amount of the capacity of a recording medium which is recording codestreams. For instance, when the remaining amount of a recording medium has diminished, the code amount of non-ROI region is reduced.

According to the present embodiment described as above, the image quality setting unit 22 adjusts the code amount of non-ROI region, so that the total code amount of the entire moving images can be suppressed below a predetermined capacity while the image quality of an object marked by a user is kept at a user-intended level.

Embodiment 3

Figure 7:
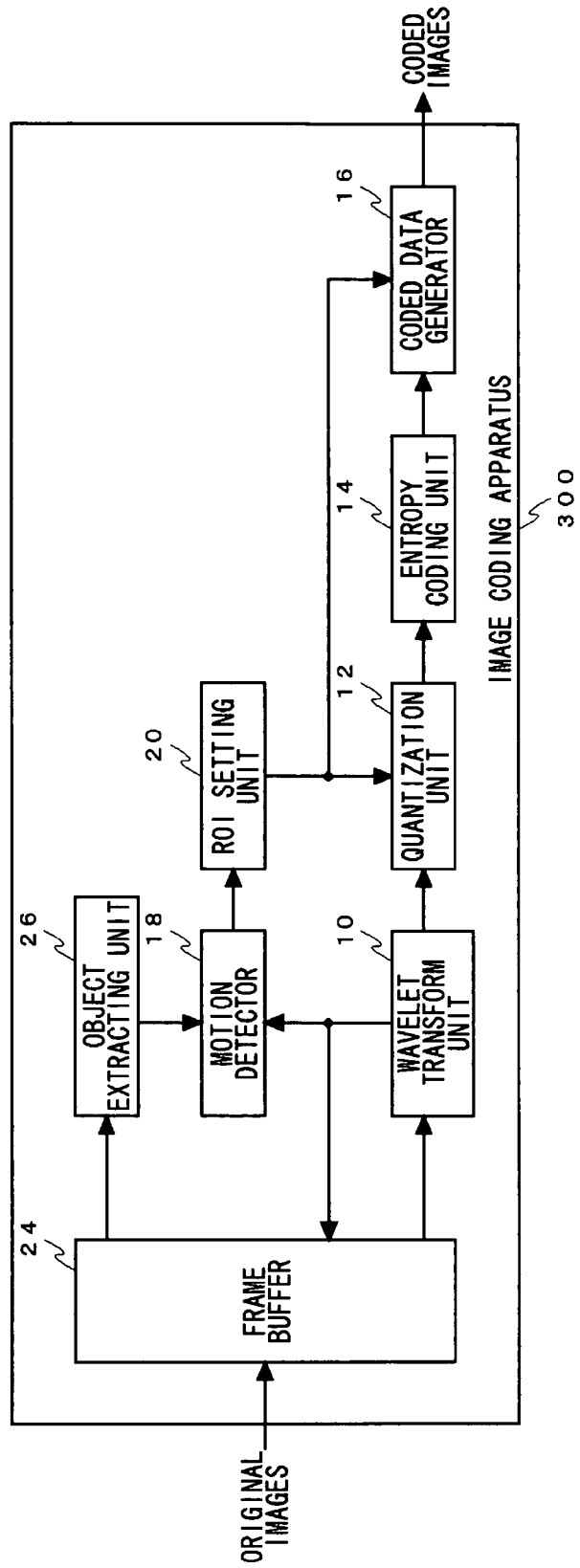
FIG. 7 illustrates a structure of an image coding apparatus according to Embodiment 3 of the first embodiment of the present invention.

FIG. 7 illustrates a structure of an image coding apparatus 300 according to Embodiment 3 of the first embodiment. The structure of this image coding apparatus 300 is such that a frame buffer 24 and an object extracting unit 26 are newly added to the image coding apparatus 100 of Embodiment 1 of the first embodiment. Hereinbelow, the same reference numerals will be used for a structure identical to that of Embodiment 1 of the first embodiment, and the structure and operation different from those of Embodiment 1 of the first embodiment will be described. A description will also be given of different operations where the structure is the same.

The frame buffer 24 is a large-capacity memory such as SDRAM, and stores at least the current frame and a previous frame, which is, for example, the frame immediately preceding the current frame. The object extracting unit 26 separates the object from the background in an image. The object extracting unit 26 compares an image of a previous frame with that of the current frame. In so doing, the image is decomposed into a plurality of blocks so as to obtain motion vectors per block, as done in the MPEG (Moving Picture Experts Group) scheme, and their mean value or mode value is set as a motion vector of the background. This utilizes the fact that a moving body serving as an object move in an irregular pattern and the background moves in the same and single direction when a viewpoint travels.

The object extracting unit 26 shifts an amount corresponding to the thus obtained motion vector, and then generates a difference image between the previous frame and the current frame. Since the background coincides or approximately coincides in this difference image, the object extracting unit 26 can, with high accuracy, remove the background. The object extracting unit 26 is provided with a reference memory unit. An object specified is detected from said image in which the background is removed, and is then stored in the reference memory unit as a reference image. The reference image may be such that a fixed reference image set at the time it was specified initially is used repeatedly, or the reference image may be updated each time. When a plurality of objects are specified, a plurality of reference images corresponding thereto are stored in the reference memory unit. There may be provided a plurality of reference memory units.

The motion detector 18 detects an absolute motion vector of an object by comparing the reference image stored in the reference memory unit and a difference image between the reference image and the next frame image. This difference image may be an image such that the background is removed or the background is kept intact. The thus detected motion vector and the motion vector of the background are outputted to the quantization unit 12. The quantization unit 18 calculates, after a quantization, a shift amount of the ROI region according to said motion vector and the motion vector of the background and moves the ROI region according to the thus calculated shift amount.

Though in the above description the object extracting unit 26 detects the motion vector of a background by comparing the previous frame image with the current frame image, the wavelet coefficients of the previous frame may be compared with the wavelet coefficients of the current frame, instead. In so doing, the image size may be made small if LL sub-bands are used. In addition to this, if LH sub-bands, LH sub-bands or HH sub-bands are used, the computation amount can be reduced because the use of such sub-bands enables to extract the contour only.

Figure 8C:
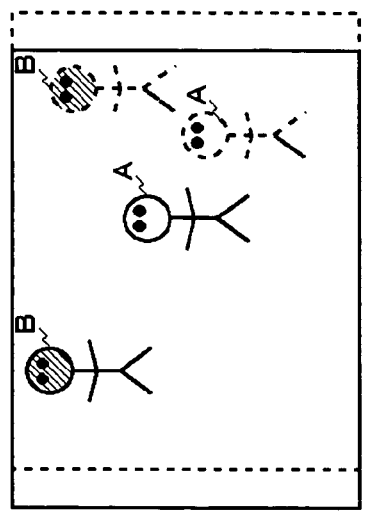
FIG. 8C shows a difference image.
Figure 8B:
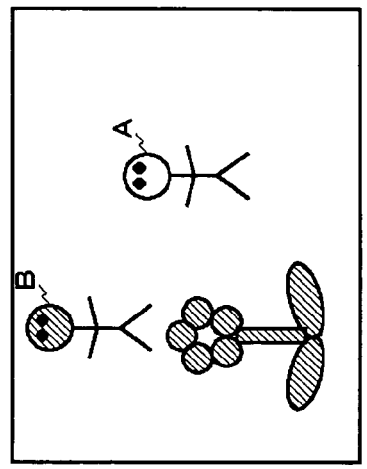
FIG. 8B shows the current frame.
Figure 8A:
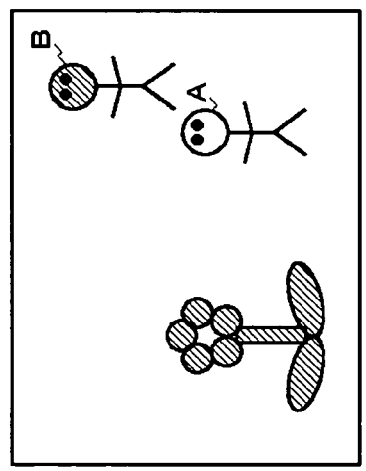
FIG. 8A shows a previous frame.

FIGS. 8A to 8C illustrate how objects are separated from the background in an image. FIG. 8A shows a previous frame. Two objects which are a person A and a person B exist in an image. FIG. 8B shows the current frame. Since the flower moves to the right, the background moves to the right, that is, the viewpoint moves to the left. The person A moves a little to the upper left whereas the person B moves quite a bit to the left. The movements of the person A and person B between two frames are relative movements. FIG. 8C shows a difference image. This difference image is synthesized in a manner such that the previous frame is moved to the right in order to offset the background movement. The absolute movements of the person A and the person B can be detected. The background can be removed.

According to the present embodiment described as above, even when the viewpoint varies in the course of taking moving images by a digital video camera or the like, the absolute motion of an object is detected by canceling out the background motion. As a result, the erroneous recognition of an object due to the change of background can be reduced and the ROI region can be followed with high accuracy.

Embodiment 4

Figure 9:
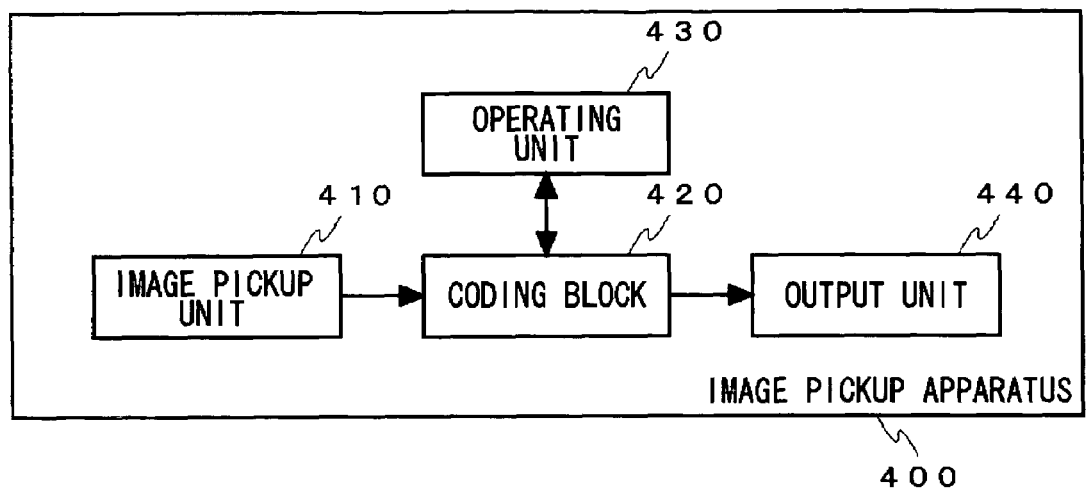
FIG. 9 illustrates an image pickup apparatus according to Embodiment 4 of the first embodiment of the present invention.

FIG. 9 illustrates an image pickup apparatus 400 according to Embodiment 4 of the first embodiment. As examples of the image pickup apparatus 400, there are a digital camera, a digital video camera, a surveillance camera and so forth.

An image pickup unit 410 is provided with, for example, a CCD (Charge Coupled Device) or the like. The image pickup unit 410 takes in the light from a subject and converts it into electric signals so as to be outputted to a coding block 420. The coding block 420 encodes an original image inputted from the image pickup apparatus 410 and sends the coded image to an output unit 440.

The coding block 420 has a structure of any of image coding apparatus described in Embodiment 1 to Embodiment 3 in the first embodiment, and generates coded images such that the image quality thereof differs between a region of interest and a non-region-of-interest. An operating unit 430 includes a liquid crystal display, organic EL display or the like and then displays thereon the images shot by the image pickup apparatus 410. The user can specify, within the image, a region of interest and an object to be marked out. For example, a cursor or frame in an image may be moved using arrow keys or the like. Or, they may be specified using a stylus pen or the like by employing a touch panel type display. The operating unit 430 may further include a shutter button or various types of operation buttons.

The output unit 440 is a detachable recording medium or a network such as LAN. The image coded by the coding block 420 is recorded in said recording medium or sent out to the network.

Figure 10A:
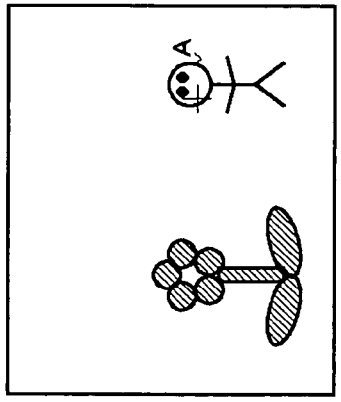
FIG. 10A shows how an object marked out by a user is specified in an image.
Figure 10B:
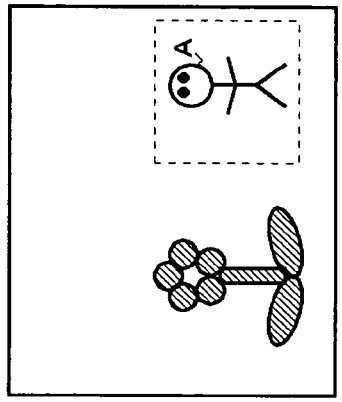
FIG. 10B shows how a ROI region is set in an image.
Figure 10C:
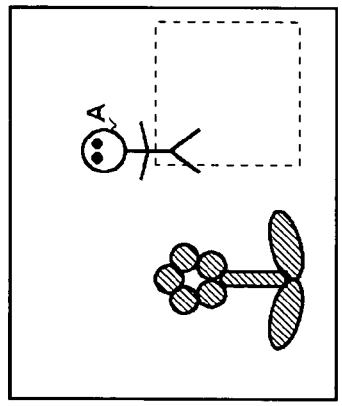
FIG. 10C shows how the object moves out of the ROI region.
Figure 10D:
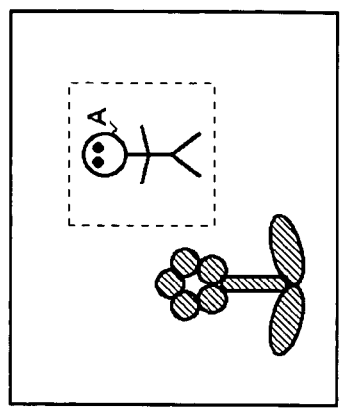
FIG. 10D shows how the ROI region follows the movement of the object.

FIGS. 10A to 10D illustrate a first example of the tracking processing by which to follow a region of interest in an image shot by an image pickup apparatus 400 according to Embodiment 4 of the first embodiment. FIG. 10A shows how an object marked out by the user is specified in an image. A person A marked out by the user is specified by a crisscross cursor. FIG. 10B shows how a ROI region is set in an image. The region enclosed by a frame is the ROI region. The ROI region may be initialized by a user operation or may be automatically initialized in a predetermined area containing the specified object. FIG. 10C shows how the person A moves and then moves out of the ROI region. FIG. 10D shows how the ROI region follows the movement of person A. The motion vector of person A is detected and the ROI region is moved corresponding to the thus detected motion vector thereof.

Figure 11C:
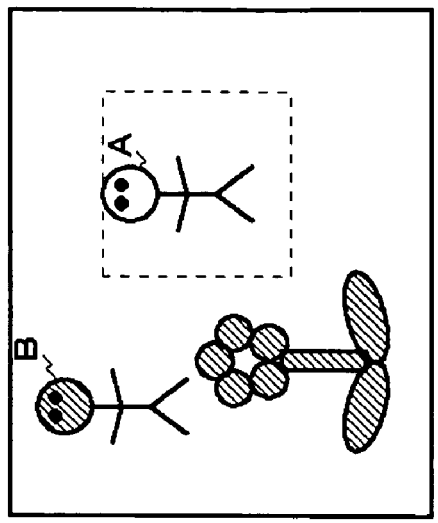
FIG. 11C shows how the ROI region follows the movement of the object.
Figure 11B:
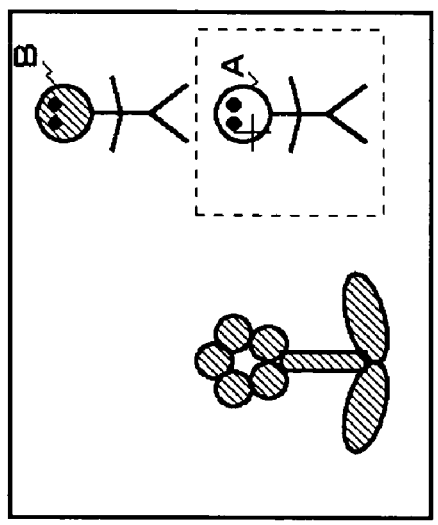
FIG. 11B shows how an object marked out by the user is specified in a ROI region.
Figure 11A:
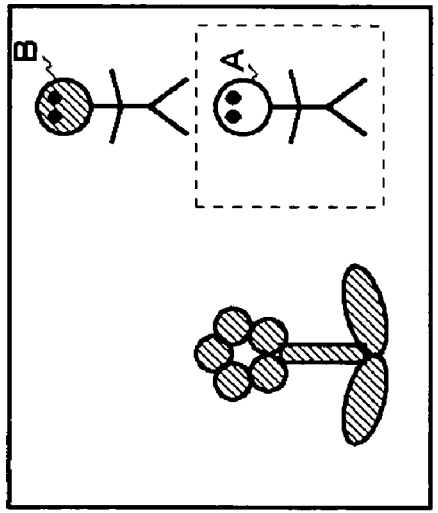
FIG. 11A shows how a user sets a ROI region in an image.

FIGS. 11A to 11C illustrate a second example of the tracking processing by which to follow a region of interest in an image shot by an image pickup apparatus 400 according to Embodiment 4 of the first embodiment. Differing from the procedure in the first example, FIG. 11A shows how the user sets a ROI region in an image. Among persons A and B, the person A is set as the object marked out by the user. It is to be noted that a plurality of ROI regions may be set. FIG. 11B shows how an object marked out by the user is specified in a ROI region. The object may be specified by the user or may be recognized automatically. FIG. 11C shows how the person A moves and the ROI region follows the movement thereof. Since the person B is not specified as the object marked out by the user, the movement of person B does not affect the movement of the ROI region.

Figure 12C:
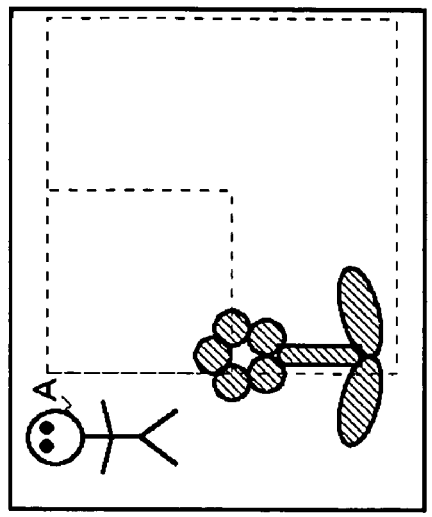
FIG. 12C shows how an object moves and then moves out of the large frame.
Figure 12B:
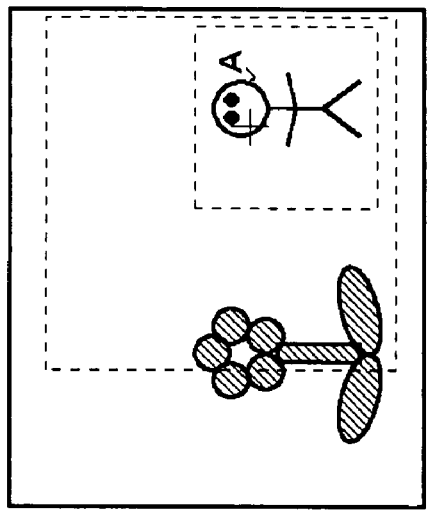
FIG. 12B shows how a ROI region is set.
Figure 12A:
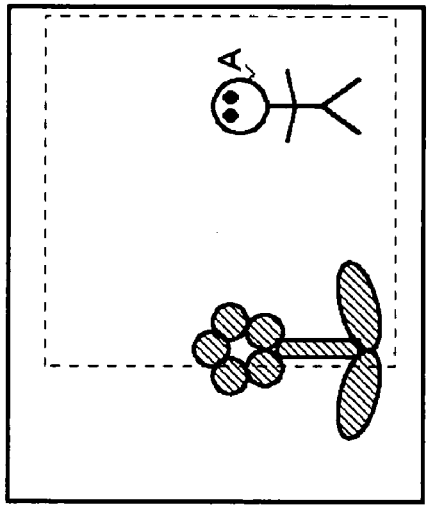
FIG. 12A shows how a range in which a ROI region is tracked is set.

FIGS. 12A to 12C illustrate a third example of the tracking processing by which to follow a region of interest in an image shot by an image pickup apparatus 400 according to Embodiment 4 of the first embodiment. FIG. 12A shows how the range in which a ROI region is tracked is set. A large frame depicted with dotted lines shows this range. FIG. 12B shows how a ROI region is set. This ROI region is allowed to move around within the large frame only. FIG. 12C shows how a person A moves and then moves out of the large frame. Since the ROI region is allowed to follow the person A within the range of the large frame, the tracking processing is terminated in the midst of it. A processing may be such that the image shooting itself is terminated if the object marked out by the user moves out of the large frame. For example, in the case when a surveillance camera is used, an intruder entering in a certain range of area needs to be recorded and it suffices if the image quality of an object such as a person in said range is maintained. The third example of the tracking processing can be applied to such a case as this, so that the code amount can be further reduced than in the first and the second example.

It goes without saying that while performing a processing of tracking the ROI region along the specified object, the image pickup apparatus 400 can take moving images and record them in the output unit 440 and so forth. During this time, the user may operate the operating unit 430 so as to cancel and reset the ROI region. When the ROI region is canceled, all regions in the image are coded at the same bit rate. Said operation by the user may suspend the shooting of moving images and then restart it. During the processing in which the ROI region is being made to follow the specified object, a structure may be such that still images can be taken if, for example, the user depresses a shutter button in the operating unit 430. In such a still image, the ROI region will be of high image quality whereas the non-ROI region will be of low image quality.

According to the present embodiment described as above, the code amount of non-ROI region is reduced. Thus, there can be provided an image pickup apparatus which can reduce the total coding amount of the entire moving images while the image quality of an object marked out by the user is maintained at the user-intended level.

The first embodiment has been described based on Embodiment 1 through Embodiment 4 which are only exemplary. It is therefore understood by those skilled in the art that there may exist various modifications to the combination of each component and process described above and that such modifications are also within the scope of the present invention. Such modifications will be described hereinbelow.

In the above Embodiments of the first embodiment, each frame of moving images is encoded sequentially by JPEG2000 scheme so as to generate codestreams of the moving images. Such a coding method is not limited to JPEG2000 scheme and any other scheme may be employed as long as codestreams of moving images are generated.

In the above method of ROI coding by reducing the bit-planes, the only lower-bits of non-ROI transform coefficients are zero-substituted and the upscaling of ROI transform coefficients is not carried out at all. A method may be such that the upscaling of ROI transform coefficients and the zero-substitution of lower bits of non-ROI transform coefficients are combined together.

In the above Embodiments of the first embodiment, when the user sets a plurality of ROI regions in the ROI setting unit 20, each of the plurality of ROI regions may be assigned a different image quality. Various levels of image quality can be realized by adjusting the zero-substitution lower bit numbers.

In all of the above-described Embodiments in the first embodiment, wavelet transform has been explained as a method of spatial filtering for the coding of an image, but other spatial frequency transformations may also be employed therefor. For example, a discrete cosine transform used in a JPEG standard can raise the compression efficiency for the entire image at the sacrifice of the image quality of the non-region-of-interest by carrying out a zero-substitution of the low-order bits of the transform coefficients of the non-region-of-interest in a similar manner and, at the same time, the image quality for the region of interest can be relatively raised.

Next, a second embodiment will be described. The related technology for the second embodiment will be described as follows.

Related Art to the Second Embodiment

At ISO/ITU-T, JPEG2000 using a discrete wavelet transform (DWT) is being standardized as a successor to JPEG (Joint Photographic Expert Group), which is a standard technology for compression and coding of still images. In JPEG2000, a wide range of image quality, from low bit-rate coding to lossless compression, can be coded highly efficiently, and a scalability function, in which the image quality is gradually raised, can be realized easily. Moreover, JPEG2000 comes with a variety of functions which the conventional JPEG standard did not have.

Reference (2) listed in the following Related Art List discloses a technology in which an image processing such as noise rejection or edge enhancement is carried out to improve the image quality when such compressed and coded images are to be decoded. More specifically, the reference image is produced in a manner that the transform coefficients contained in the sub-bands other than LL sub-band are set to "0". The region on the reference image for the coefficients within said sub-bands is obtained, and an average value or the like of pixel values of this region is obtained. If this average value or the like is smaller than a predetermined threshold value, a threshold processing is performed on this transform coefficient.

Related Art List
(2) Japanese Patent Application Laid-Open No. 2002-135593.

In the above-mentioned Reference (2), the above-mentioned processing is performed on the transform coefficients in the sub-bands other than LL sub-band. This causes the calculation amount to increase significantly. Also, it is difficult to create enough difference in the image quality among the regions in an image to the degree that a certain object is conspicuous enough in the image.

Next, the summary of the second embodiment will be as follows. The second embodiment has been made in view of the foregoing circumstances and problems, and an object thereof is to provide an image decoding method, an image decoding apparatus and an image pickup apparatus capable of easily making a marked-out object appear conspicuous enough.

To solve the above problems, an image decoding method according to a second embodiment of the present invention is such that a region of interest is set within an image, the region of interest is tracked along motion of an object marked out within the image, and moving images are decoded in a manner that an image quality for the region of interest differs from that for a region other than the region of interest. According to this mode of carrying out the present invention, the regions of interest can be easily picked out.

Another preferred mode of carrying out the second embodiment relates to an image decoding apparatus. This apparatus includes: a region-of-interest setting unit which sets a region of interest within an image; a motion detector which detects motion of an object marked out within the image; and a decoding unit which decodes moving images in a manner that an image quality for the region of interest differs from that for a region other than the region of interest. The region-of-interest setting unit has the region of interest follow the motion of an object. The "region of interest" may be initialized by a user operation. According to this mode of carrying out the second embodiment, the regions of interest can be easily enhanced. Furthermore, the amount of calculation in decoding the images can be reduced.

The apparatus may further include an image quality setting unit which sets an image quality for at least one of the region of interest and a region other than said region of interest by referring to a state of the apparatus. The "state of the apparatus" may include a battery remaining amount or reproduction speed. According to this mode of carrying out the second embodiment, the images can be decoded by adapting the apparatus to the state thereof.

Still another preferred mode of carrying out the second embodiment relates to an image pickup apparatus. This apparatus has an image pickup unit which acquires images. A region of interest is set within an image, the region of interest is tracked along motion of an object marked out within the image, and moving images are displayed in a manner that an image quality for the region of interest differs from that for a region other than the region of interest. According to this mode of carrying out the second embodiment, the regions of interest can be easily picked out.

Still another preferred mode of carrying out the second embodiment relates also to an image pickup apparatus. This apparatus includes: an image pickup unit which acquires an image; a region-of-interest setting unit which sets a region of interest within the image; a motion detector which detects motion of an object marked out within the image; a coding unit which codes moving images in a manner that an image quality for the region of interest differs from that for a region other than the region of interest; and a decoding unit which decodes image data coded by the coding unit. The region-of-interest setting unit has the region of interest follow the motion of an object.

According to this mode of carrying out the second embodiment, the object marked out in an image shot can be easily enhanced. Furthermore, the code amount of coded images can be reduced.

The apparatus may further include an image quality setting unit which sets an image quality for at least one of the region of interest and a region other than said region of interest by referring to a state of the apparatus. The "state of the apparatus" may include a battery remaining amount or reproduction speed. The images can be displayed by adapting the apparatus to the state thereof.

Any arbitrary combination of the above-described structural components and expressions changed among a method, an apparatus, a system, a computer program, a recording medium and so forth are all effective as the modes of carrying out the present invention.

The second embodiment will be described hereunder.

Second Embodiment

Embodiment 1

Figure 13:
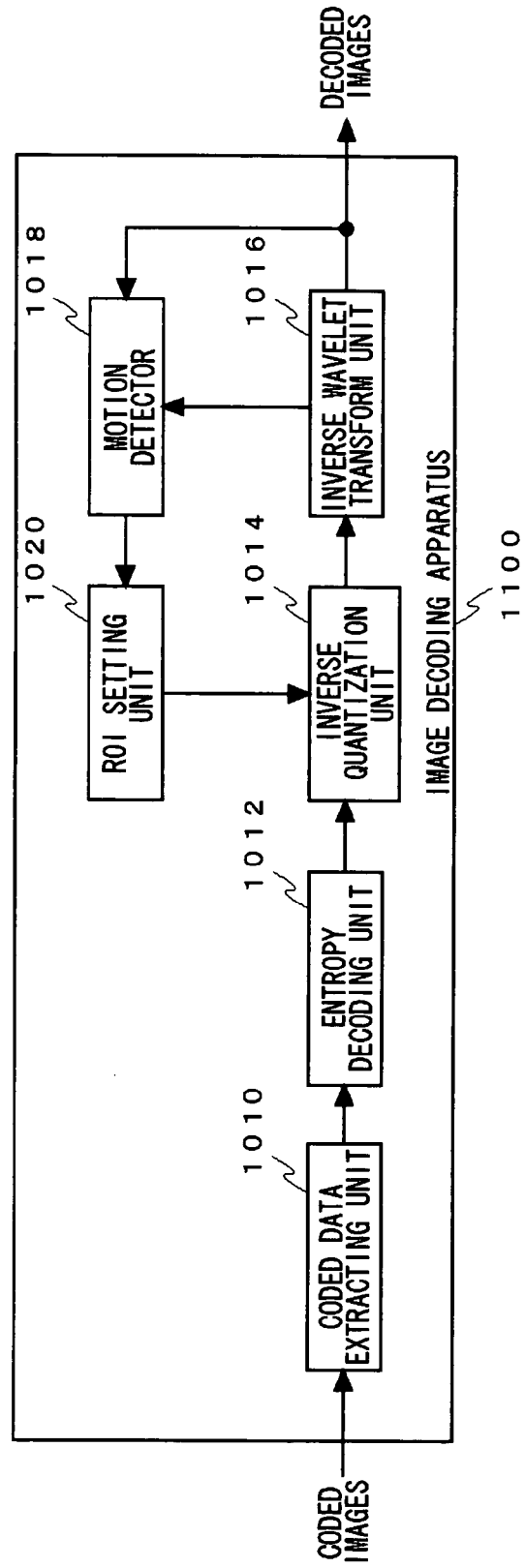
FIG. 13 illustrates a structure of an image decoding apparatus according to Embodiment 1 of a second embodiment of the present invention.

FIG. 13 illustrates a structure of an image decoding apparatus 1100 according to Embodiment 1 of a second embodiment. In terms of hardware, this structure of image decoding apparatus 1100 can be realized by a CPU, a memory and other LSIs of an arbitrary computer. In terms of software, it can be realized by memory-loaded programs which have decoding functions or the like, but drawn and described herein are function blocks that are realized in cooperation with those. Thus, it is understood by those skilled in the art that these function blocks can be realized in a variety of forms such as by hardware only, software only or the combination thereof.

In Embodiment 1 of the second embodiment, the image decoding apparatus 1100 decodes coded images which have been compressed and coded by, for example, JPEG2000 scheme. A coded image inputted to the image decoding apparatus 1100 is a normal coded image which has not been ROI-coded, where the ROI coding is such that a region of interest (ROI) of an image is coded in preference to the other region. The image decoding apparatus 1100 specifies a region of interest (hereinafter referred to as ROI or ROI region) and preferentially decodes the ROI region.

The coded images inputted to the image decoding apparatus 1100 may be coded frames of moving images. The moving images can be reproduced by sequentially decoding each coded frame of moving images inputted as codestreams.

A coded data extracting unit 1010 extracts coded data from the inputted coded images. An entropy decoding unit 1012 decodes the coded data bit-plane by bit-plane and stores in a memory unit (not shown) the quantized wavelet transform coefficients derived as a result of the decoding.

A motion detector 1018 detects the position of a specified object, and then outputs the detected position thereof to a ROI setting unit 1020. The object may be specified by a user or it may be automatically recognized by the motion detector 1018 from within a user-specified ROI. Also, it may be automatically recognized from the entire image. A plurality of objects may be specified.

In the case of motion images, the position of an object may be expressed by motion vectors. Hereinafter, a specific detection method by motion vectors will be described using examples. Firstly, the motion detector 1018 is provided with memories such as SRAM and SDRAM, and it stores in said memory as a reference image the image of an object specified in the frame at the time when the object was specified. It is preferable that the reference image having a block, of a predetermined size, containing the specified position be stored. The motion detector 1018 detects a motion vector by comparing the reference image with the image of a current frame. The motion vector can be calculated by using high-frequency components of wavelet transform coefficients and estimating contour components of the object. Alternatively, the MSB (Most Significant Bit) bit-plane of the wavelet transform coefficients after quantization or a plurality of bit planes in the MSB side may be used.

Secondly, the motion detector 1018 compares the current frame with a previous frame, for example, the frame immediately preceding the current frame so as to detect the motion vectors of an object. Thirdly, the motion detector 1018 compares wavelet transform coefficients after wavelet transform, instead of the frame images, and thereby detects the motion vectors. The wavelet coefficient may be one associated with any of LL sub-band, HL sub-band, LH sub-band and HH sub-band. An object which is to be compared with the current frame may be a reference image registered at the time of specification or a reference image registered from a previous frame, for example, the frame immediately preceding it.

Fourthly, the motion detector 1018 detects the motion vectors of an object using a plurality of wavelet transform coefficients. For instance, the motion vector can be detected for each of HL sub-band, LH sub-band and HH sub-band, and then the average of these three detected motion vectors can be calculated, or one which is closest to the motion vector of a previous frame is selected from among these three motion vectors. As a result, the accuracy in detecting the motion vectors of an object can be raised.

A user may specify beforehand in the motion detector 1018 a range within which these motion vectors are to be detected in an image. For instance, when images taken by a surveillance camera for shops such as a convenience store are decoded, a processing can be performed in a manner that an object, such as a person, who has entered within a certain range from a cash register is marked out while the motion of an object who has gone out of the range is not marked.

The ROI setting unit 1020 acquires, from the motion detector 1018, positional information such as the motion vectors of objects, and moves a ROI region in accordance with the thus acquired positional information. Depending on a detection method implemented by the motion detector 1018, a shift amount from the initially set ROI region or a travel distance from the immediately previous frame is calculated so as to determine the position of the ROI of the current frame.

The user sets the position, size, image quality or the like of a ROI region to the ROI setting unit 1020 as initial values. If the region of interest selected is a rectangle, information on the ROI position may be given as the coordinate values of pixels in the upper left corner of the rectangular region and the number of pixels of the rectangular region in the vertical and horizontal directions. If the user specifies an object or if the motion detector 1018 performs automatic recognition, a predetermined range within which the object lies may be automatically set as the ROI region by the ROI setting unit 1020.

The form of a ROI region may be a rectangular, circular or other complex shape. Though the form of a ROI region itself is a fixed shape in principle, the form may vary in the central part and the periphery of an image or the form may be dynamically varied by a user operation. Also, a plurality of ROI regions may be set.

Based on the ROI setting information, the ROI setting unit 1020 generates ROI masks necessary for specifying wavelet transform coefficients, namely, ROI transform coefficients, corresponding to a ROI region. The inverse quantization unit 1014 adjusts the number of low-order bits to be substituted with zeros in a bit string of the wavelet transform coefficients corresponding to a non-region-of-interest (also referred to as non-ROI or non-ROI region) according to a relative degree of priority of the ROI region to the non-ROI region. And by referring to the ROI masks generated, a certain amount of bits, counted from the least significant bit (LSB) side of the non-ROI transform coefficients, among the wavelet coefficients decoded by the entropy decoding unit 1012 is substituted with zeros.

Here, the number of bits to be zero-substituted is an arbitrary natural number the upper limit of which is the maximum number of bits of quantization values in the non-ROI region. By varying this number of zero-substitution bits, a degradation degree of reproduced image of non-ROI region relative to the ROI region can be adjusted in a continuous manner. Then the inverse quantization unit 1014 inverse-quantizes the wavelet transform coefficients containing the ROI transform coefficients and the non-ROI transform coefficients whose low-order bits are zero-substituted. An inverse wavelet transform unit 1016 inverse-transforms the inverse-quantized wavelet transform coefficients and outputs a decoded image thus obtained.

Figure 14C:
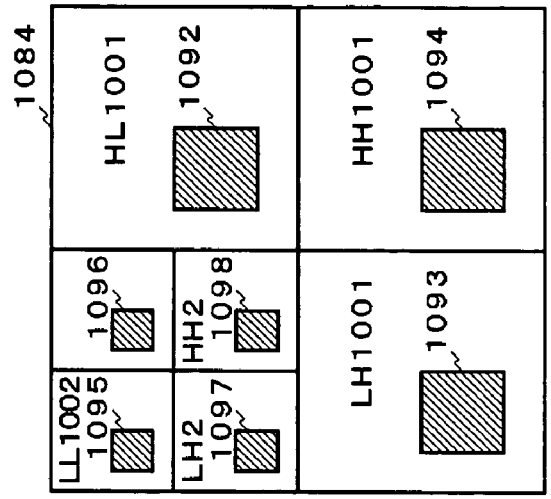
FIG. 14C shows a second-hierarchy transform image obtained by performing another wavelet transform on a sub-band LL1 of a transform image shown in FIG. 14B.
Figure 14B:
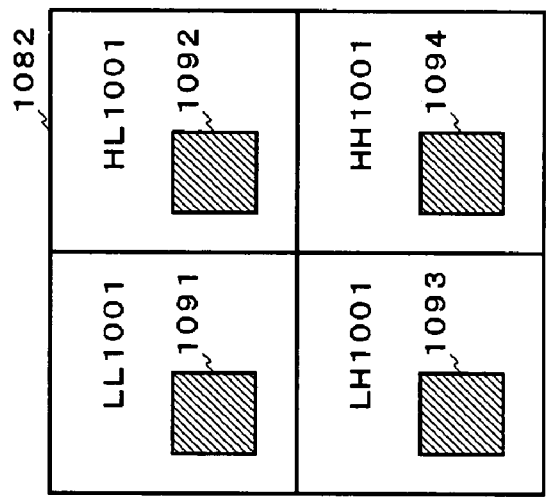
FIG. 14B shows a first-hierarchy transform image obtained by performing one-time wavelet transform on the original image.
Figure 14A:
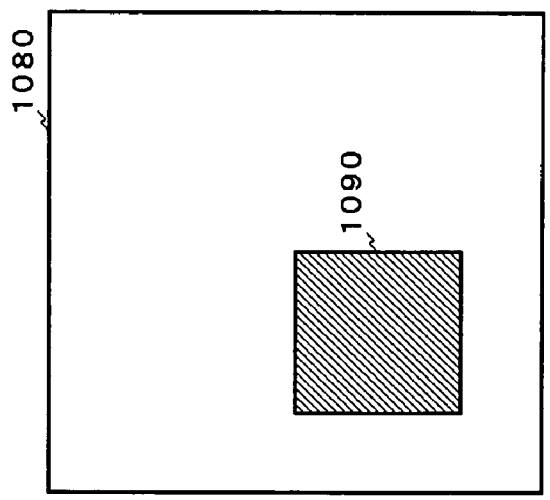
FIG. 14A illustrates a state in which a region of interest is selected in an original image.

FIGS. 14A to 14C illustrate ROI masks generated by the ROI setting unit 1020. As shown in FIG. 14A, suppose that a region of interest 1090 is selected in an original image 1080 by the ROI setting unit 1020. The ROI setting unit 1020 specifies, at each sub-band, wavelet transform coefficients necessary for restoring the region of interest 1090 selected in the original image 1080.

FIG. 14B shows a first-hierarchy transform image 1082 which is obtained by performing one time wavelet transform on the image 1080. The first-hierarchy transform image 1082 is composed of four first-level sub-bands LL1001, HL1001, LH1001 and HH1001. The ROI setting unit 1020 specifies wavelet transform coefficients in the first-hierarchy transform image 1082, namely, ROI transform coefficients 1091 to 1094, necessary for restoring the ROI region 1090 in the original image 1080 at each of the first-level sub-bands LL1001, HL1001, LH1001 and HH1001.

FIG. 14C shows a second-hierarchy transform image 1084 obtained by performing another wavelet transform on the sub-band LL1001 which is the lowest-frequency component of the transform image 1082 shown in FIG. 14B. Referring to FIG. 14C, the second-hierarchy transform image 1084 contains four second-level sub-bands which are composed of LL1002, HL1002, LH1002 and HH1002, in addition to three first-level sub-bands HL1001, LH1001 and HH1001. In each of the second-level sub-bands of LL1002, HL1002, LH1002 and HH1002, the ROI setting unit 1020 specifies wavelet transform coefficients on the second-hierarchy transform image 1084, namely, ROI transform coefficients 1095 to 1098 necessary for restoring the ROI transform coefficient 1091 in the sub-band LL1001 of the first-hierarchy transform image 1082.

In the similar manner, by specifying recursively the ROI transform coefficients that correspond to the ROI region 1090 at each hierarchy for a certain number of times corresponding to the number of wavelet transforms done, all ROI transform coefficients necessary for restoring the ROI region 1090 can be specified in the final-hierarchy transform image. The ROI setting unit 1020 generates a ROI mask for specifying the position of this finally specified ROI transform coefficient in the final-hierarchy transform image. For example, when the wavelet transform is carried out two times only, generated are ROI masks which can specify the position of seven ROI transform coefficients 1092 to 1098 which are represented by areas shaded by oblique lines in FIG. 14C.

FIGS. 15A to 15C illustrate how low-order bits of wavelet transform coefficients after decoding the coded images are zero-substituted. FIG. 15A shows wavelet transform coefficients 1074 of an entropy-decoded image, which include five bit-planes. In FIG. 15B, the ROI transform coefficients associated with the ROI region specified by the ROI setting unit 1020 are represented by the area shaded by oblique lines. Referring to FIG. 15C, the inverse quantization unit 1014 generates wavelet transform coefficients 1076 in which the two lower bits of non-ROI transform coefficients are zero-substituted.

It is to be noted here that the ROI setting unit 1020 may select a non-ROI region instead of a ROI region. For example, if a user wants regions containing personal information, such as a face of a person or a license plate of a car, to be blurred, such regions are selected as non-ROI regions. In this case, a mask for specifying ROI transform coefficients can be generated by inverting the mask for specifying the non-ROI transform coefficients. Or the mask for specifying the non-ROI transform coefficients may be given to the inverse quantization unit 1014.

When coded frames of moving images are inputted consecutively to the image decoding apparatus 1100, the image decoding apparatus 1100 can carry out the following operation, too. That is, the image decoding apparatus 1100 normally performs a simplified reproduction by appropriately discarding low-order bit-planes of wavelet transform coefficients in order to reduce the processing load. As a result, since the lower bit-planes were discarded, a simplified reproduction at, for instance, 30 frames per second is possible even when the image decoding apparatus 1100 is subject to limitations in its processing performance.

When a ROI region in an image is selected during a simplified reproduction, the image decoding apparatus 1100 reproduces the image by decoding, down to the lowest-order bit-plane, the wavelet transform coefficients for which the low-order bits of the non-ROI region have been zero-substituted. At this time, the processing load rises, and the result may be a loss of frames to 15 frames per second, for instance, or a slowed reproduction. However, the ROI region can be reproduced with high image quality.

In this manner, when a ROI region is selected, the ROI region only can be reproduced with a higher quality while the quality of the non-ROI region remains at a level equal to the simplified reproduction. This proves useful for such a case handling the surveillance images in which high-quality images are not required at normal times but an image of a portion in question such as a ROI needs to be reproduced with high quality in times of unusual and abnormal situation. For reproduction of moving images by a mobile terminal, the image decoding apparatus 1100 may be used in the following manner, for example. That is, in view of battery life, the moving images are reproduced with low quality in the power saving mode, with the ROI region reproduced with higher quality only when necessary.

An image decoding apparatus 1100 according to Embodiment 1 of the second embodiment, therefore, can decode a normal coded image, which is not ROI-coded, in such a manner that the image quality for the ROI region is relatively raised higher than that for the non-ROI regions by zero-substituting the low-order bits of the wavelet transform coefficients corresponding to the non-ROI regions, thus easily enhancing an object marked out by the user. Furthermore, the ROI region only is decoded preferentially, so that the processing amount can be reduced compared with the normal decoding processing. Thus, the processing can be performed at high speed and the power consumed can also be reduced.

Embodiment 2

Figure 16:
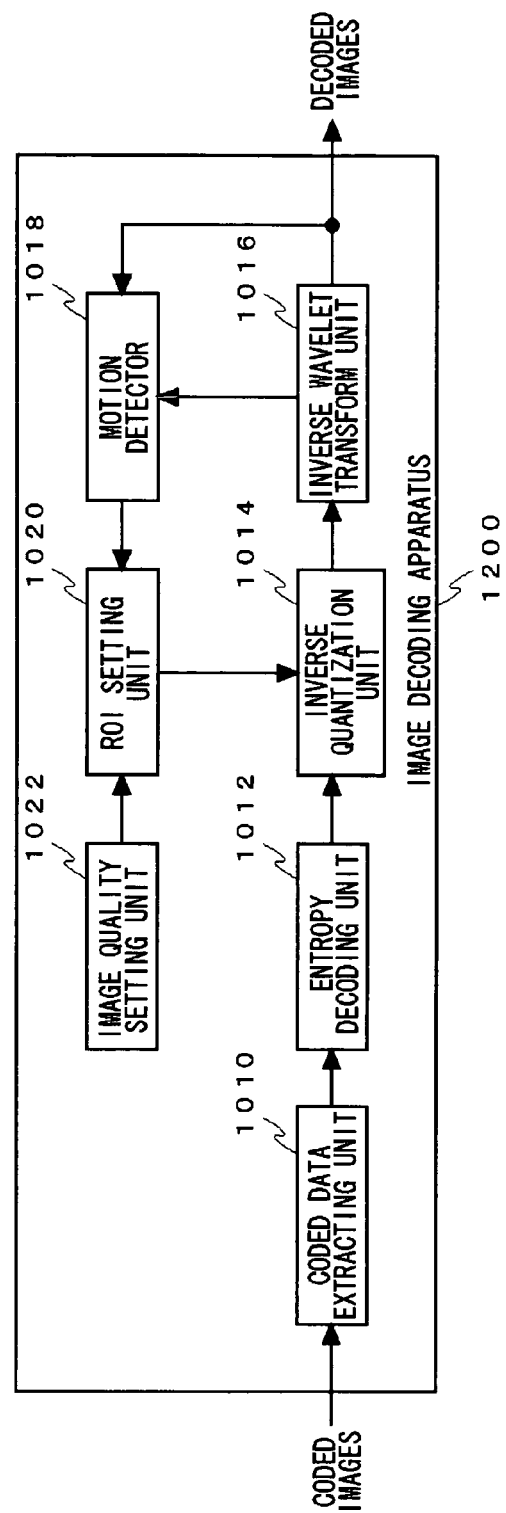
FIG. 16 illustrates a structure of an image decoding apparatus according to Embodiment 2 of the second embodiment of the present invention.

FIG. 16 illustrates a structure of an image decoding apparatus 1200 according to Embodiment 2 of the second embodiment. The structure of this image decoding apparatus 1200 is such that an image quality setting unit 1022 is newly added to the image decoding apparatus 1100 of Embodiment 1 of the second embodiment. Hereinbelow, the same reference numerals will be used for a structure identical to that of Embodiment 1 of the second embodiment, and the structure and operation different from those of Embodiment 1 of the second embodiment will be described.

The user can set the initial values of image quality for ROI region and non-ROI region to a ROI setting unit 1020 from the image quality setting unit 1022. Even during the reproduction of moving images, the image quality for at least one of a ROI region and a non-ROI region can be changed to a desired level. According to this change, an inverse quantization unit 1014 adjusts the number of low-order bits to be substituted with zeros in a bit string of the wavelet transform coefficients corresponding to at least one of the ROI region and the non-ROI region. With this structure and the operation thereof, a user-intended level of image quality difference between the ROI region and the non-ROI region can be created.

The image setting unit 1022 can also lower the image quality for at least one of the ROI region and the non-ROI region, in accordance with the reproduction speed. That is, when the double-speed reproduction or the like is selected by the user, there are cases where the processing for decoding the coded images cannot be completed in time. In such cases, the processing amount is lightened by, for example, lowering the image quality for the non-ROI region. With this structure and the operation thereof, the moving images can be reproduced without dropping frames, irrespective of reproduction speed.

When the image decoding apparatus 1200 is installed in portable equipment such as a mobile-phone handset, PDA (Personal Digital Assistant), portable-type DVD (Digital Video Disk) player or detachable car navigation device, the image quality setting unit 1022 can lower the image quality for at least one of the ROI region and the non-ROI region, in accordance with the battery remaining amount. That is, when the battery remaining amount is getting low, the power consumption is reduced by, for example, lowering the image quality of the non-ROI region. As a result, the length of time for which the images can be reproduced after the battery remaining amount becomes low can be extended.

Embodiment 3

Figure 17:
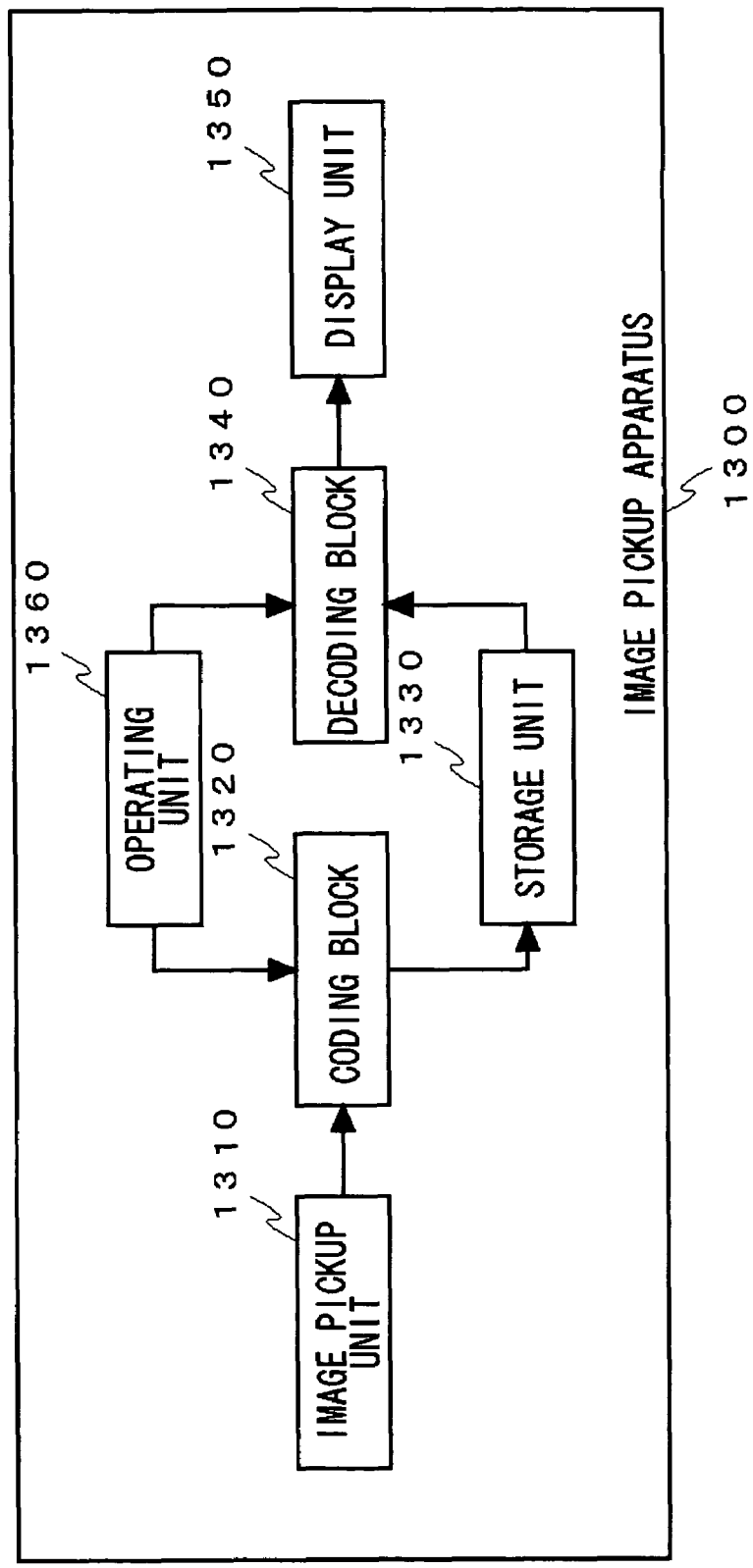
FIG. 17 illustrates a structure of an image pickup apparatus according to Embodiment 3 of the second embodiment of the present invention.

FIG. 17 illustrates a structure of an image pickup apparatus 1300 according to Embodiment 3 of the second embodiment. Examples of such an image pickup apparatus include a digital camera, a digital video camera and a surveillance camera.

The image pickup unit 1310 is provided with, for example, a CCD (Charge Coupled Device) or the like, takes in the light from a subject and converts it into electric signals so as to be outputted to a coding block 1320. The coding block 1320 encodes an original image inputted from the image pickup apparatus 1310 and stores the coded image in a storage unit 1330. The original images inputted to the coding block 1320 may be moving image frames. And the moving image frames may be consecutively coded and stored in the storage unit 1330.

A decoding block 1340 reads out the coded images from the storage unit 1330, decodes the coded images and supplies the decoded images to a display unit 1350. The coded images read out of the storage unit 1330 may be coded frames of moving images. The decoding block 1340 has a structure of the image decoding apparatus 1100 described in Embodiment 1 or the image decoding apparatus 1200 described in Embodiment 2 of the second embodiment, and decodes the coded images stored in the storage unit 1330. The decoding block 1340 receives from an operating unit 1360 the information on a ROI region set in an image, decodes preferentially the ROI region and generates decoded images in a manner such that the image quality for the ROI region differs from that for the non-ROI region.

The display unit 1350 is provided with a liquid crystal display, organic EL display or the like and then displays thereon the images decoded by the decoding block 1340. With a user's operation, the operating unit 1360 can specify a ROI region or a marked-out object in a screen image on the display unit 1350. For example, the user may move a cursor or frame in an image using arrow keys or the like. Or, the user may specify the ROI region or marked-out object using a stylus pen if a touch panel type display is employed. The operating unit 1360 may also include a shutter button or various types of operation buttons.

According to the present embodiment, an image pickup apparatus can be provided which can easily enhance an object marked out by the user. Furthermore, the ROI region only is decoded preferentially, so that the processing amount can be reduced compared with the normal decoding processing. Thus, the processing can be performed at high speed and the power consumed can also be reduced. By reducing the power consumption, the maximum shooting time, namely, the maximum recording time of, for example, the digital camera and digital video camera in particular can be extended.

Next, a modification to Embodiment 3 of the second embodiment will be described. In this modification, the ROI region is preferentially decoded in the decoding block 1320, the coded images are generated where the image quality differs between the ROI region and the non-ROI region, and these coded images are decoded by the decoding block 1340.

Figure 18:
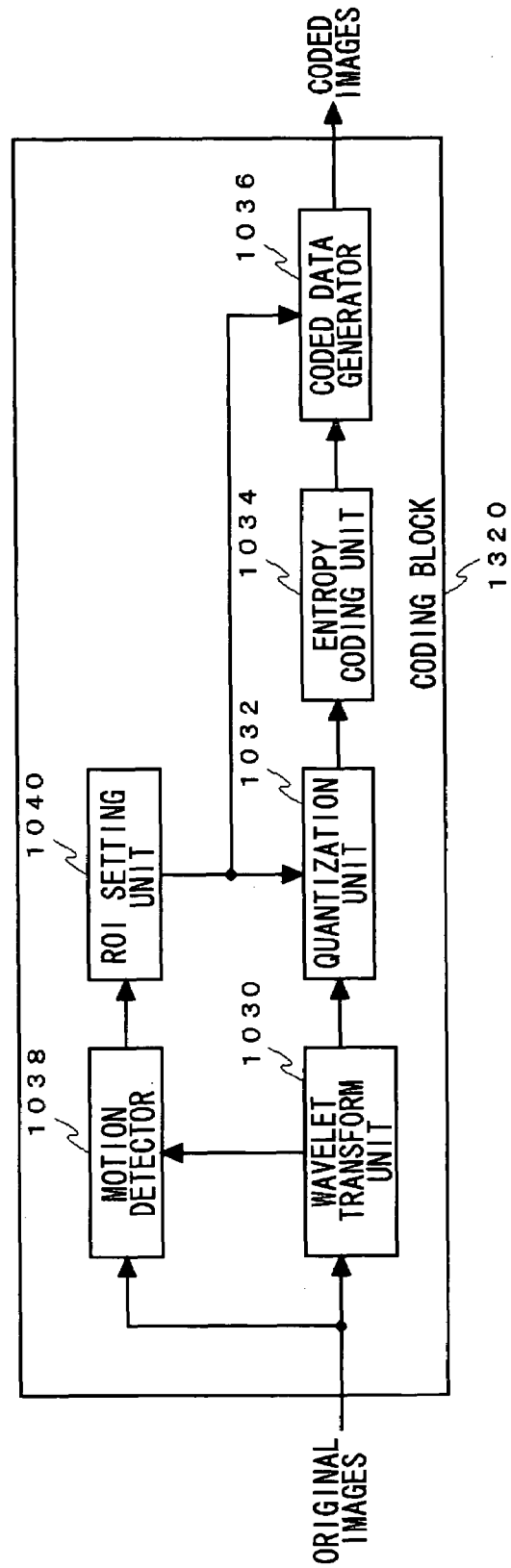
FIG. 18 illustrates a structure of a coding block according to a modification to Embodiment 3 of the second embodiment.

FIG. 18 illustrates a structure of a coding block 1320 according to a modification to Embodiment 3 of the second embodiment. The coding block 1320 performs compression and coding of inputted original images by, for example, JPEG2000 scheme.

A wavelet transform unit 1030 divides an original image inputted from an image pickup apparatus 1310 into sub-bands, computes wavelet transform coefficients of each of the sub-bands and then generates hierarchized wavelet coefficients. To be more precise, the wavelet transform unit 1030 applies a low-pass filter and a high-pass filter in the respective x and y directions of the original image, and divides the image into four frequency sub-bands so as to carry out a wavelet transform. These sub-bands are an LL sub-band which has low-frequency components in both x and y directions, an HL sub-band and an LH sub-band which have a low-frequency component in one of the x and y directions and a high-frequency component in the other, and an HH sub-band which has high-frequency components in both x and y directions. The number of pixels in the vertical and horizontal directions of each sub-band is ½ of that of the image before the processing, and one time of filtering produces sub-band images whose resolution, or image size, is ¼ of the image.

The wavelet transform unit 1030 performs another filtering processing on the image of the LL sub-band among the thus obtained sub-bands and divides it into another four sub-bands LL, HL, LH and HH so as to perform the wavelet transform thereon. The wavelet transform unit 1030 performs this filtering a predetermined number of times, hierarchizes the original image into sub-band images and then outputs wavelet transform coefficients for each of the sub-bands. A quantization unit 1032 quantizes, with a predetermined quantizing width, the wavelet transform coefficients outputted from the wavelet transform unit 1030.

The structure and the operation of both a motion detector 1038 and a ROI setting unit 1040 are the same in essence as those of the motion detector 1018 and the ROI setting unit 1020 in the image decoding apparatus 1100 and 1200 according to Embodiment 1 and Embodiment 2 of the second embodiment. The differences therefrom will be described hereinbelow. A ROI setting unit 1040 outputs ROI setting information to a quantization unit 1032 and a coded data generator 1036 so as to perform ROI coding on the information. As the ROI coding, there is available the MAXSHIFT method in which the bit-planes of wavelet transform coefficients associated with a ROI region in an image is scaled up by a maximum number of bits of the bit-plane of wavelet transform coefficients associated with non-ROI region. According to this technique, all the bit-planes of ROI transform coefficients are coded before any of the bit-planes of non-ROI transform coefficients.

Figure 19A:
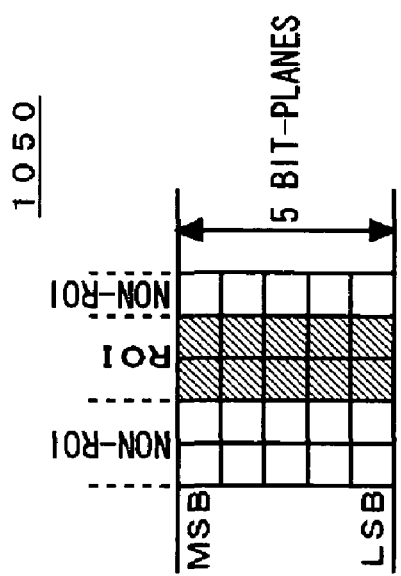
FIG. 19A shows wavelet transform coefficients.

First, an example where the ROI coding is carried out by the MAXSHIFT method is explained. FIG. 19A shows wavelet transform coefficients 1050 after quantization, which include bit-planes each having five bits from MSB to LSB.

The ROI setting unit 1040 sets a ROI region in an original image based on the positional information of the ROI region, and generates ROI masks that are used to specify the ROI transform coefficients. The ROI transform coefficients are represented by the shaded portions in the wavelet transform coefficients 50 of FIG. 19A.

Figure 19B:
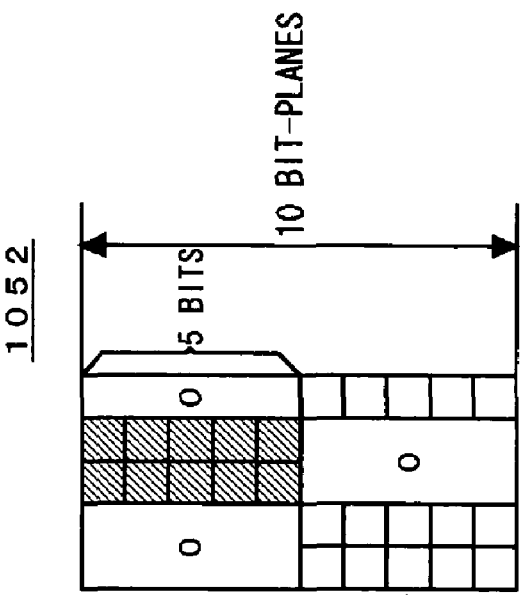
FIG. 19B shows wavelet transform coefficients with ROI transform coefficients scaled up by 5 bits.

The quantization unit 1032 scales up the quantized ROI transform coefficients by S bits, using the ROI mask. That is, the values of the ROI transform coefficients are shifted to the left by as much as S bits. Here, the amount S of the scale-up is a natural number larger than the number of bits of the maximum value of the quantized values of non-ROI transform coefficients. FIG. 19B shows wavelet transform coefficients 1052 with the ROI transform coefficients scaled up by 5 bits. Zeros are allotted to the digits that are newly created as a result of the upscaling in the wavelet transform coefficients 1052 after the upscaling.

Figure 19C:
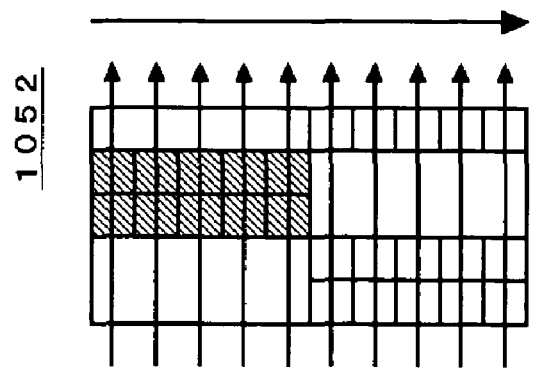
FIG. 19C shows how quantized values of wavelet transform coefficients resulting from a scale-up are scanned in order from high-order bit-planes.

An entropy coding unit 1034 entropy-codes the quantized values of the wavelet transform coefficients 1052 resulting from a scale-up, by scanning them in order from high-order bit-planes as indicated by the arrows in FIG. 19C.

The coded data generator 1036 acquires the ROI setting information, such as the position and scale-up amount, from the ROI setting unit 1040 and also acquires information necessary for generating headers, such as quantizing width, from the entropy coding unit 1034 so as to generate the headers. The entropy-coded data are turned into a stream, and the coded images are outputted to a storage unit 1330. Then, the coded images in the storage unit 1330 can be outputted to a recording medium or network. Here, an SDRAM, flash hard disk drive or the like may be used as the recording medium.

As described above, when the ROI coding is performed using the MAXSHIFT method, the bit-planes of a ROI region are preferentially coded even though the coding is terminated halfway to reduce the amount of codes. As a result, the image quality for the ROI region can be made higher than that for the non-ROI region.

Next, an example in which the ROI coding is performed by reducing the bit-planes will be explained. The ROI setting unit 1040 generates ROI masks using the technique described with reference to FIG. 14. After the quantization, the quantization unit 1032 adjusts the number of low-order bits to be substituted with zeros in a bit string of the wavelet transform coefficients corresponding to a non-ROI region according to the degree of priority in setting the image quality. By referring to the ROI mask generated by the ROI setting unit 1040, S bits only counted from the lowest bit in the bit string of the non-ROI transform coefficients not masked by the ROI masks are substituted with zeros. Here, the number of zero-substitution bits, or S, is an arbitrary natural number the upper limit of which is the maximum number of bits of quantization values in the non-ROI region. By varying this number of zero-substitution bits S, a degradation degree of reproduced image of non-ROI region relative to the ROI region can be adjusted in a continuous manner.

Figure 20C:
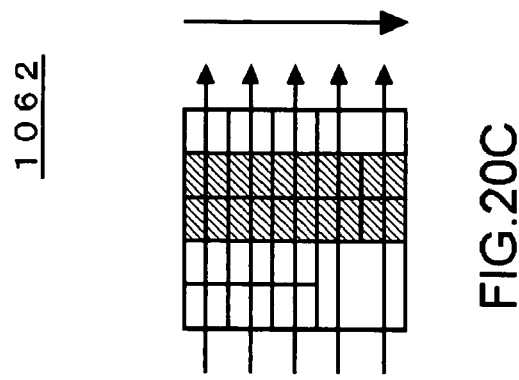
FIG. 20C shows how wavelet transform coefficients containing ROI transform coefficients and the zero-substituted non-ROI transform coefficients are scanned in order from high-order bit planes.
Figure 20B:
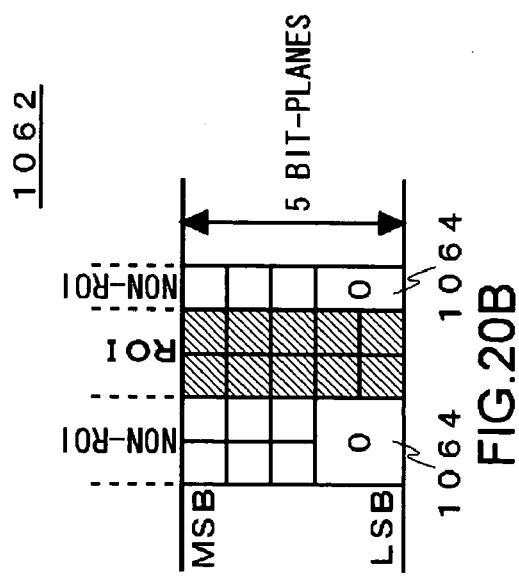
FIG. 20B shows how S bits in the LSB side of non-ROI transform coefficients are substituted with zeros.
Figure 20A:
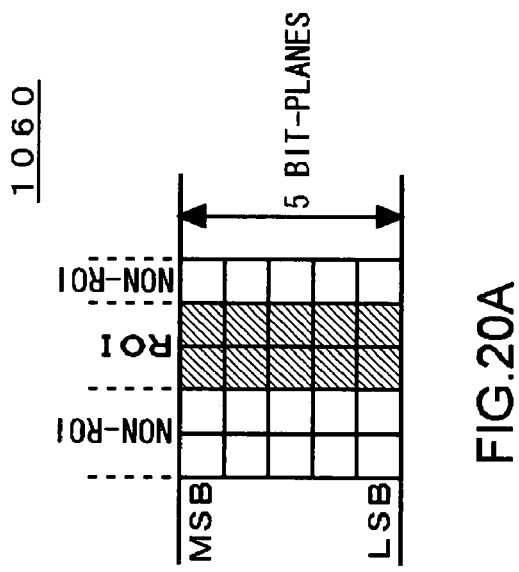
FIG. 20A shows wavelet transform coefficients.

FIGS. 20A to 20C illustrate how low-order bits of wavelet transform coefficients 1060 of an original image are zero-substituted by the quantization unit 1032. FIG. 20A shows the wavelet transform coefficients 1060 obtained after a quantization, which include five bit-planes, and the ROI transform coefficients are represented by the area shaded by oblique lines.

Referring to FIG. 20B, the quantization unit 1032 substitutes S bits in the LSB side of non-ROI transform coefficients which are not masked by the ROI masks, with zeros. S=2 in this example, and the wavelet transform coefficients 1062 where 2 bits in the LSB side of non-ROI coefficients are substituted with zeros are obtained as shown by the reference numeral 1064 of FIG. 20B. It is to be noted here that lower 2 bit-planes may simply be discarded instead of substituting the lower 2 bit-planes with zeros.

The entropy coding unit 1034 entropy-codes the wavelet transform coefficients 1062 containing the ROI transform coefficients and the zero-substituted non-ROI transform coefficients by scanning the bit-planes in order from MSB as indicated by the arrows in FIG. 20C.

The coded data generator 1036 generates headers based on coding parameters such as quantizing width. The coded data generator 1036 also processes entropy-coded data into a stream and outputs it to the storage unit 1330.

In a case where there is an upper limit set for the data size of a final coded image due to some limitations in storage capacity, transmission rate and so forth, the entropy coding unit 1034 may, in order to operate within the upper limit of the data size, generally discontinue a coding process at a halfway bit-plane when the quantized wavelet coefficients are being coded in sequence from the higher bit-plane. Or, the coded data generator 1036 may, in order to operate within the limit of transmission rate, discontinue the output of streams at a halfway bit-plane when stream-processed coded data are being outputted in order from the high-order plane.

Accordingly, even when the data size of a coded image is subject to some limitation, the wavelet transform coefficients corresponding to non-ROI regions are zero-substituted in low-order bit-planes and the wavelet transform coefficients corresponding to the ROI region only are subjected to coding as significant information. As a result, the compression efficiency for low-order bit-planes is high, and thus the data size will not increase much even when the coding covers down to and reaches the lowest bit-plane.

As described above, since the coding method by which to reduce bit planes doesn't go through the trouble of any scale-up processing of ROI transform coefficients, the coding computation can be carried out efficiently. Also, with no increase in the number of bit-planes to be coded, any extra storage area is not required, thus reducing hardware cost.

Also, since there is no need for scale-down processing to be performed at decoding, there is no need of adding the ROI position information and scale-up amount data to the header of the coded data. Furthermore, an image which has been ROI-coded by this method is no different in format from a normal coded image, so that it can be decoded by exactly the same decoding processing as for the normal coded image. This also ensures to retain compatibility among decoding processings.

As described above, according to the modification to the Embodiment 3 of the second embodiment, the decoding block 1340 decodes the ROI region preferentially. Thus, the code amount of coded images can be reduced, in addition to the advantageous effect obtained when generated are decoded images where the image quality thereof differs between the ROI region and the non-ROI region.

Figure 21D:
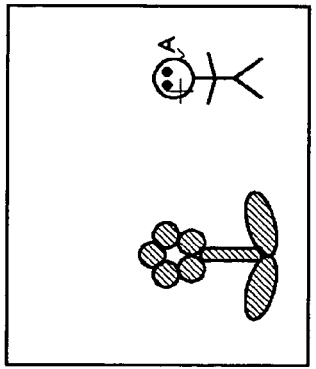
FIG. 21D shows how the ROI region follows the movement of the object.
Figure 21C:
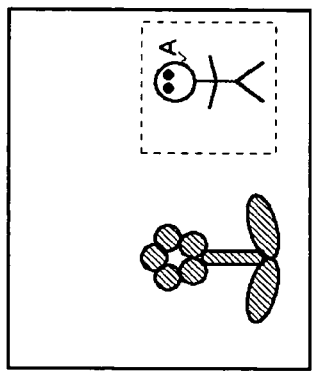
FIG. 21C shows how the object moves out of the ROI region.
Figure 21B:
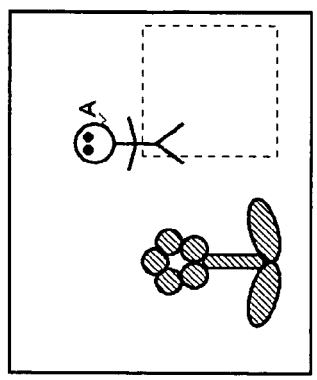
FIG. 21B shows how a ROI region is set in an image.
Figure 21A:
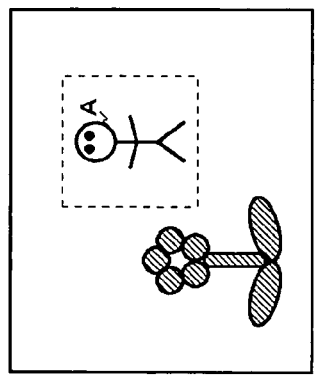
FIG. 21A shows how an object marked out by a user is specified in an image.

FIGS. 21A to 21D illustrate a first example of the ROI-tracking processing described above. FIG. 21A shows how an object marked out by the user is specified in an image. A person A marked out by the user is specified by a crisscross cursor. FIG. 21B shows how a ROI region is set in an image. The region enclosed by a frame is the ROI region. The ROI region may be initialized by a user operation or may be automatically initialized in a predetermined area containing the specified object. FIG. 21C shows how the person A moves and then moves out of the ROI region. FIG. 21D shows how the ROI region follows the movement of person A. The motion vector of person A is detected and the ROI region is moved corresponding to the thus detected motion vector thereof.

Figure 22A:
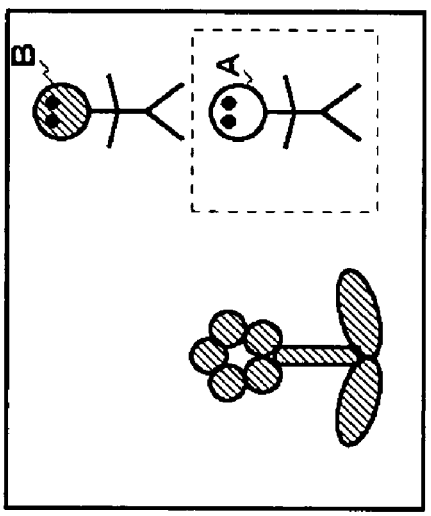
FIG. 22A shows how a user sets a ROI region in an image.
Figure 22B:
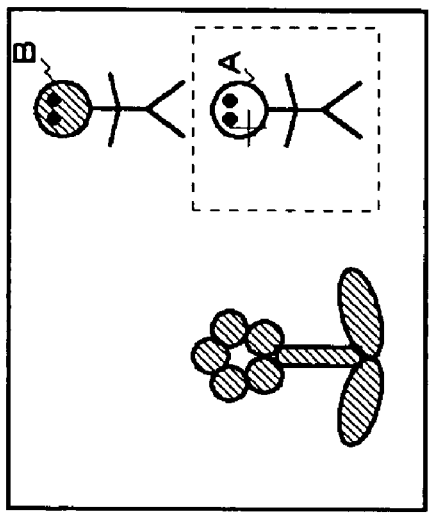
FIG. 22B shows how an object marked out by the user is specified in a ROI region.
Figure 22C:
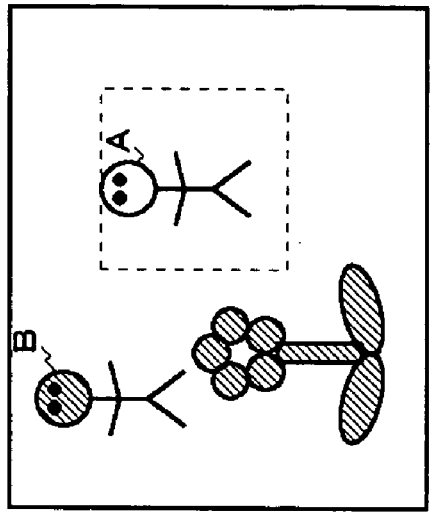
FIG. 22C shows how the ROI region follows the movement of the object.

FIGS. 22A to 22C illustrate a second example of the ROI-tracking processing. Differing from the procedure in the first example, FIG. 22A shows how the user sets a ROI region in an image. Among persons A and B, the person A is set as the object marked out by the user. A plurality of ROI regions may be set. FIG. 22B shows how an object marked out by the user is specified in a ROI region. The object may be specified by the user or may be recognized automatically. FIG. 22C shows how the person A moves and the ROI region follows the movement thereof. Since the person B is not specified as the object marked out by the user, the movement of person B does not affect the movement of the ROI region.

FIGS. 23A to 23C illustrate a third example of the ROI-tracking processing. FIG. 23A shows how the range in which a ROI region is tracked is set. A large frame depicted with dotted lines shows this range. FIG. 23B shows how a ROI region is set. This ROI region is allowed to move around within the large frame only. FIG. 23C shows how the person A moves and then moves out of the large frame. Since the ROI region is allowed to follow the person A within the range of the large frame, the tracking processing is terminated in the midst of it. A processing may be such that the image taking or the like is terminated if the object marked out by the user moves out of the large frame. For example, in the case when a surveillance camera is used, an intruder entering in a certain range of area needs to be recorded and it suffices if the image quality of an object such as a person in said range is maintained. The third example of the ROI-tracking processing can be applied to such a case as this, so that the code amount can be further reduced than in the first and the second example.

While performing a processing of tracking the ROI region along the specified object, the image pickup apparatus 1300 according to Embodiment 3 of the second embodiment can, of course, take moving images and record them in a recording medium and so forth. During this time, the user may operate the operating unit 1360 so as to cancel and reset the ROI region. When the ROI region is canceled, all regions in the mage are coded at the same bit rate. Said operation by the user may suspend the shooting of moving images and then restart it. During the processing in which the ROI region is being made to follow the specified object, a structure may be such that still images can be taken if, for example, the user depresses a shutter button in the operating unit 1360. In such a still image, the ROI region will be of high image quality whereas the non-ROI region will be of low image quality.

The second embodiment has been described based on Embodiment 1 through Embodiment 3 which are only exemplary. It is therefore understood by those skilled in the art that there may exist various modifications to the combination of each component and process described above and that such modifications are also within the scope of the present invention. Such modifications will be described hereinbelow.

In the above Embodiments of the second embodiment, the codestreams of moving images encoded sequentially by JPEG2000 scheme are decoded. The method is not limited to JPEG2000 scheme and any other scheme may be employed as long as the codestreams of moving images are decoded.

In the above Embodiments of the second embodiment, when the user sets a plurality of ROI regions in the ROI setting unit 1020 or 1040, each of the plurality of ROI regions may be assigned a different image quality. Various levels of image quality can be realized by adjusting the zero-substitution lower bit numbers.

In the above Embodiments of the second embodiment, the image quality differs between the ROI region and the non-ROI region, by substituting with zeros the wavelet transform coefficients after decoding of the coded images. In this respect, if coded independently for each pass, a method in which variable-length decoding is discontinued in the middle can be used. In JPEG2000 scheme, three kinds of processing passes that are S pass (significance propagation pass), R pass (magnitude refinement pass) and C pass (cleanup pass) are each used as coefficient bits within a bit-plane. In S pass, insignificant coefficients each surrounded by significant coefficients are decoded. In R pass, significant coefficients are decoded, and in C pass, the remaining coefficients are decoded. Each processing pass has a degree of contribution to the image quality of an image increased in the order of S pass, R pass and C pass. The respective processing passes are executed in this order and the context of each coefficient is determined in consideration of information on surrounding neighbor coefficients. According to this technique, there is no need to execute the zero-substitution, so that the processing amount can be further reduced.

In the above Embodiments of the second embodiment, the wavelet transform has been explained as a method of spatial filtering for the coding of an image, but other spatial frequency transformations may also be employed. For example, a discrete cosine transform used in a JPEG standard can raise the compression efficiency for the entire image at the sacrifice of the image quality of the non-ROI region by carrying out the zero-substitution of the low-order bits of the transform coefficients of the non-ROI region in a similar manner and, at the same time, the image quality for the ROI region can be relatively raised.

Although the present invention has been described by way of exemplary embodiments and modifications as above, it should be understood that many other changes, substitutions and modifications may further be made by those skilled in the art without departing from the scope of the present invention which is defined by the appended claims.

What is claimed is:

1. A computer-implemented image decoding method, comprising causing a processor to:

set a region of interest within a frame image of moving images, the region of interest including an object of interest;

track motion of the object within the moving images by detecting a motion vector of the object and moving the region of interest in accordance with the motion vector; and decode the moving images in such a manner that an image quality for the region of interest differs from that for a region other than the region of interest.

2. An image decoding apparatus, including:

a region-of-interest setting unit for setting a region of interest within a frame image of a moving image, the region of interest including an object of interest;

a motion detector for detecting motion of the object within the moving image; and a decoding unit for decoding the moving images in such a manner that an image quality for the region of interest differs from that for a region other than the region of interest, wherein said region-of-interest setting unit causes the region of interest to follow the motion of the object by moving the region of interest in accordance with the motion vector.

3. An image decoding apparatus according to claim 2, further including an image quality setting unit which sets an image quality for at least one of the region of interest and the region other than the region of interest by referring to a state of the apparatus.

4. An image decoding apparatus according to claim 3, wherein said image setting unit sets the image quality by referring to reproduction speed.

5. An image pickup apparatus, including:

an image pickup unit for acquiring moving images;

a region of interest setting unit for setting a region of interest within a frame image in the moving images acquired by the image pickup unit, the region of interest including an object of interest; and a motion vector detector for tracking motion of the object within the moving images by detecting a motion vector of the object and moving the region of interest in accordance with the motion vector; and a display unit for displaying the moving images in such a manner that an image quality for the region of interest differs from that for a region other than the region of interest.

6. An image pickup apparatus according to claim 5, further including an image quality setting unit which sets an image quality for at least one of the region of interest and the region other than the region of interest by referring to a state of the apparatus.

7. An image pickup apparatus according to claim 6, wherein said image setting unit sets the image quality by referring to reproduction amount.

* * * * *